US010913911B1

(12) United States Patent
Roe

(10) Patent No.: US 10,913,911 B1
(45) Date of Patent: Feb. 9, 2021

(54) CHEMICAL COMPOSITIONS AND TREATMENT SYSTEMS AND TREATMENT METHODS USING SAME FOR REMEDIATING $H_2S$ AND OTHER CONTAMINANTS IN GASSES

(71) Applicant: GAPS Technology, LLC, Slidell, LA (US)

(72) Inventor: Cliffton Lee Roe, Harrison Township, MI (US)

(73) Assignee: Gaps Technology LLC, Slidell, LA (US)

( * ) Notice: Subject to any disclaimer, the term of this patent is extended or adjusted under 35 U.S.C. 154(b) by 0 days.

(21) Appl. No.: 16/857,884

(22) Filed: Apr. 24, 2020

Related U.S. Application Data

(60) Provisional application No. 62/903,425, filed on Sep. 20, 2019.

(51) Int. Cl.
*B01D 53/18* (2006.01)
*B01D 53/14* (2006.01)
(Continued)

(52) U.S. Cl.
CPC .............. *C10L 3/103* (2013.01); *B01D 53/18* (2013.01); *B01D 53/263* (2013.01); *C10L 3/104* (2013.01);
(Continued)

(58) Field of Classification Search
CPC ...... C10L 3/103; C10L 3/104; C10L 2290/30; C10L 2290/541; C10L 2290/544; B01D 53/18; B01D 53/263
See application file for complete search history.

(56) References Cited

U.S. PATENT DOCUMENTS 2,592,523 A 4/1952 Ayers et al.
3,262,753 A 7/1966 Urano et al.
(Continued)

FOREIGN PATENT DOCUMENTS

EP 0 432 858 A1 6/1991

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

(Continued)

*Primary Examiner* — Cabrena Holecek
(74) *Attorney, Agent, or Firm* — Carrier Blackman & Associates, P.C.; Joseph P. Carrier; William D. Blackman

(57) ABSTRACT

A treatment composition for remediating for remediating $H_2S$ and other contaminant(s) in contaminated gasses comprising: an aqueous hydroxide solution containing at least one hydroxide compound at a collective concentration of 35-55 weight percent of the aqueous hydroxide solution; at least one organic acid selected from the group consisting of fulvic acid and humic acid; and a chelating agent, wherein the aqueous hydroxide solution constitutes at least 80 wt % of the treatment composition, the at least one organic acid constitutes 0.1-5 wt % of the treatment composition, the chelating agent constitutes 0.1-5 wt % of the treatment composition, and a pH of the treatment composition is at least 12.0.

19 Claims, 3 Drawing Sheets

(51) Int. Cl.
*C10L 3/00* (2006.01)
*C10L 3/10* (2006.01)
*C10L 3/12* (2006.01)
*B01D 53/26* (2006.01)

(52) U.S. Cl.
CPC ............. *C10L 3/12* (2013.01); *C10L 2290/30* (2013.01); *C10L 2290/541* (2013.01); *C10L 2290/544* (2013.01)

(56) References Cited

U.S. PATENT DOCUMENTS

| | | | |
|---|---|---|---|
| 3,708,421 | A | 1/1973 | Rippie |
| 3,897,219 | A | 7/1975 | Sibeud et al. |
| 4,417,986 | A | 11/1983 | Connaught et al. |
| 4,746,442 | A | 5/1988 | Calemma et al. |
| 5,635,056 | A | 6/1997 | Brons et al. |
| 7,914,669 | B2 | 3/2011 | Martinie et al. |
| 9,028,679 | B2 | 5/2015 | Morris |
| 10,550,337 | B2 | 2/2020 | Roe et al. |
| 2009/0065399 | A1 | 3/2009 | Kocal et al. |
| 2010/0056404 | A1* | 3/2010 | Talley ................... B01D 53/52 507/239 |
| 2015/0037274 | A1* | 2/2015 | Walia ................... A01K 1/0047 424/76.8 |

OTHER PUBLICATIONS

Mike Nicholson/Tim O'Brian, Baker Petrolite Corporation, "Hydrogen Sulfide in Petroleum", pp. 1-28, found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006), pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi X, Li Q, Wang T, Lackner KS (2017), "Kinetic analysis of an anion exchange absorbent for CO2 capture fromambient air." PLoS One 12(6): e0179828. https://doi.org/10.1371/journal. pone. 0179828, pp. 1-12.

* cited by examiner

CHEMICAL COMPOSITIONS AND TREATMENT SYSTEMS AND TREATMENT METHODS USING SAME FOR REMEDIATING $H_2S$ AND OTHER CONTAMINANTS IN GASSES

CROSS-REFERENCE TO RELATED APPLICATIONS

The present application claims the benefit of priority to U.S. Provisional Patent Application No. 62/903,425, filed Sep. 20, 2019. The entire subject matter of this priority documents, including specification claims and drawings thereof, is incorporated by reference herein.

BACKGROUND OF THE INVENTION

1. Field of the Invention

The present disclosure relates to novel treatment compositions and treatment methods for remediating sulfur-containing compounds, including $H_2S$, and other contaminants in various gasses, including hydrocarbon based gasses such as natural gas. More particularly, the present disclosure relates to such treatment systems, methods and compositions in which the contaminated gasses are chemically reacted with the treatment compositions in the treatment systems and treatment methods whereby almost all of the contaminants in the gasses are rapidly remediated down to very low levels that have been deemed safe in a practical, efficient and economical manner.

2. Background

Sulfur-containing compounds including hydrogen sulfide ($H_2S$) have long been recognized as undesirable contaminants in hydrocarbon liquids such as crude oil and liquified petroleum gas (LPG), as well as in hydrocarbon gasses such as natural gas, and aqueous solutions such as solutions extracted from the earth along with crude oil and in natural gas. $H_2S$ is a particularly undesirable contaminant because it is highly toxic, corrosive, etc. and generally hydrocarbon liquids and gasses should contain less than four ppm $H_2S$. Remediation of $H_2S$ in hydrocarbon liquids and gasses has long been and remains a very important focus of petroleum industries around the world.

Further, many of the hydrocarbon liquids and gasses which are extracted from the ground may contain significant amounts of many other contaminants, including carbon dioxide, sodium chloride, nitrogen, etc., which should also be remediated down to low, acceptable levels to improve the quality and value of the hydrocarbon liquids and gasses.

However, the presence of these other contaminants will typically complicate the treatment required for remediating $H_2S$, and has conventionally required additional, special treatment compositions and methods beyond those used for remediating $H_2S$ in the contaminated liquids and gasses. A particular complicating factor in treating naturally occurring hydrocarbon based liquids and gasses such as crude oil and natural gas, is the fact that such liquids and gasses typically have widely varying characteristics that must be considered. For example, even in relation to one given oil well or natural gas well, the crude oil and aqueous solutions extracted therefrom have characteristics which can vary greatly, e.g., crude oil or natural gas extracted from a given well at a given time on a given day, can contain amounts of $H_2S$, as well as various types and amounts of other contaminants, which are significantly different from those contained in crude oil or natural gas extracted from the same well on the same day, but at a different time.

There are many known methods for remediating sulfur-containing compounds, including $H_2S$, from crude oil and other liquids. For example, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include amine processes involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a preliminary step in sweetening liquid hydrocarbons; and since the used solvent in this process cannot be easily regenerated, caustic scrubbers are most often applied where low acid gas ($H_2S$) volumes must be treated.

$H_2S$ remediation achieved by a conventional amine treatment process uses an amine such as monoethanolamine (MEA) or triazine for treating $H_2S$ in crude oil. However, with the conventional amine treatment process, while the $H_2S$ may be initially remediated or abated down to acceptable levels, the sulfur contained in the treated oil may undesirably revert back to $H_2S$ over time, especially if the treated oil is heated. Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

A conventional caustic treatment used to remediate $H_2S$ in crude oil involves use of a caustic aqueous solution consisting of up to 20% NaOH by weight. The water and caustic material are used to extract $H_2S$ from the crude oil into solution, dissociating $H_2S$ to HS— ion at higher pH, which shifts the equilibrium of $H_2S$ gas from oil to water. Then, the HS— can react with sodium to form NaHS (sodium bisulfide), or with $S_2$— to form $Na_2S$ (sodium sulfide), for example, plus water as a byproduct according to the following equations.

$$H_2S + NaOH \rightarrow NaHS + H_2O \qquad (1)$$

$$NaHS + NaOH \rightarrow Na_2S + H_2O \qquad (2)$$

Generally, the conventional caustic treatment methods are limited to using caustic solutions of only up to 20 weight percent NaOH because the conventional methods are designed and intended to be partly a liquid-liquid extraction, and partly a chemical reaction to convert the $H_2S$ gas to a solid sulfurous species. It is conventionally understood that a certain amount of water is needed to permit the chemical reactants to contact with the crude oil or other petroleum based liquid. The larger amounts of water contained in the conventional caustic treatment solutions permit a greater amount of liquid-liquid extraction. Also, it is known that use of excessive amounts of NaOH may damage the crude oil, as well as metal components used handling the crude oil such as pipes and tanks.

Additionally, some of the $H_2S$ may be converted into sulfur dioxide ($SO_2$) gas, e.g., upon stirring which allows air containing oxygen to get into the oil, which may be released from the treated petroleum based liquid, depending on the pressure under which the treated liquid is kept. Generally, hydroxides including NaOH are reducing agents and would not produce sulfur dioxide or elemental sulfur if the treated hydrocarbon based liquid is not exposed to air. However, if the oil is exposed to air, the sulfide/bisulfide can be oxidized to $SO_2$ or to elemental sulfur. All sulfide species are the same oxidation state (−2) and NaOH is not changing the oxidation state. Similar reactions would occur for other hydroxides included in the treatment solution. Relative to any such sulfur dioxide ($SO_2$) gas, as well as any other gases that may be released from the treated crude oil, it would be necessary as a safety measure to provide some head space in a closed tank or other closed vessel transporting the treated liquid to assure that the pressure does not get excessively high.

Recently, the present inventor has proposed other treatment compositions and processes for remediating $H_2S$ and other contaminants, as set forth in International Application Nos. PCT/US2018/050913 and PCT/US2018/064015, the contents of these International Applications are incorporated herein by reference. The previously proposed treatment compositions have proven to be very efficient for remediating sulfur-containing compounds, including $H_2S$, from hydrocarbon based liquids including crude oil, and from contaminated aqueous solutions, much more so than other conventionally known treatment compositions, and with no undesirable effects.

One of the proposed processes involves an aqueous treatment solution containing primarily a high concentration of one or more hydroxides such as sodium hydroxide (NaOH) and potassium hydroxide (KOH), e.g., collectively the hydroxides account for 35-55 weight percent, and preferably at least 45 weight percent of the treatment solution, which efficiently react with $H_2S$ to convert it to non-toxic substances. Such treatment solution according to the recent proposal is highly alkaline with a pH of 13-14. In such treatment process the treatment solution is added to the hydrocarbon based liquids or aqueous solutions being treated at appropriate dosage rates depending on multiple factors, and the hydroxide(s) in the solution efficiently remediate the $H_2S$ and other sulfur-containing compounds down to acceptable levels within relatively short time periods, and without otherwise detrimentally affecting the hydrocarbon-petroleum based liquids or contaminated aqueous solutions in any significant manner. The recently proposed treatment solution may further include one or more other components depending on the specific characteristics of the liquids being treated and other factors relating to the remediation treatment process. For example, the treatment solution may include a silicate such as potassium silicate ($K_2SiO_3$) or barium (Ba) as an antibacterial agent, but the high concentration of hydroxide(s) in the treatment solution is a primary characteristic of the solution because this is important for efficient remediation of $H_2S$ by the hydroxide(s) in the liquids being treated.

Such recently proposed treatment process is based on the inventor's discovery that the conventional treatment methods using an aqueous solution consisting of up to 20% NaOH by weight is inefficient for remediating $H_2S$, and that the $H_2S$ in contaminated liquids can be much more efficiently remediated using their proposed treatment solution containing a much higher collective concentration of one or more hydroxides. The inventor's recently proposed treatment process is not a wash type process, but involves rapid chemical reactions that greatly reduce the mass transfer of the gas to aqueous phase. What the treatment process does differently in comparison to the conventional treatment processes for remediating $H_2S$ in hydrocarbon based liquids, is to essentially reduce the initial amount of water being added via the treatment solution to the minimum effective amount.

While it is known that $H_2S$ gas is more soluble in oil than in water and that a rate-limiting step in the remediation of $H_2S$ from crude oil is typically the mass transfer of $H_2S$ from the oil phase into the aqueous phase, the inventor has discovered that: the liquid-liquid extraction aspect of the conventional methods is actually not that important in comparison to the chemical reaction aspect, e.g., because the initial solubility of $H_2S$ into water, as given by Henry's Law, is low; the larger amounts of water used in aqueous treatment solutions according to the conventional methods also function to dilute the NaOH and transfer the $H_2S$ from the hydrocarbon liquid into the water without abating the $H_2S$, which is undesirable because this slows the process needed to produce ionized HS— and $S_2$— ions that allow more of the $H_2S$ contained in the petroleum liquids into solution, and it is much more efficient and effective to remove the $H_2S$ primarily though a chemical reaction process and to a much lesser degree a liquid-liquid extraction. The present inventor has also discovered that since the chemical reactions involved between hydroxides and $H_2S$, e.g., equations (1), (2) above, produce water, the produced water can readily diffuse through the hydrocarbon based liquid being treated as it is produced because the caustic solution has good migration tendencies in many hydrocarbon based liquids and the diffusion may also be enhanced by agitation and/or heating of the treated liquids. Correspondingly, they determined that it is unnecessary to add any significant amount of water in the treatment process apart from the water in the treatment solution in order for the hydrocarbon based liquid to be effectively treated for remediation of sulfur-containing contaminants, including $H_2S$, and other contaminants therein. Relative to the inventor's discovery 1), it should be noted that equation (2) above is reversible, so large amounts of water hydrolyze the sodium sulfide ($Na_2S$) back to NaOH and NaHS. In other words, equation (2) in the reverse direction is a hydrolysis reaction.

Such recently proposed treatment process may involve use of only one hydroxide such as sodium hydroxide (NaOH) or potassium hydroxide (KOH), but may also involve use of a combination of hydroxides for more completely reacting with most or all of the sulfides in the petroleum based liquids, noting that there are more than 300 species of sulfur compounds, although hydrogen sulfide $H_2S$ is by far the main contaminant that must be remediated. For example, some other species of undesirable sulfur compounds include ethyl mercaptan ($CH_3CH_2SH$), dimethyl sufide ($C_2H_6S$), isobutyl mercatan ($C_4H_{10}S$) and methyl thiophene ($C_5H_6S$). Sodium hydroxide is very effective for use in the treatment solution because it does not harm the petroleum based liquids when used in appropriate amounts, and is relatively inexpensive. Potassium hydroxide is more effective than sodium hydroxide for reacting with some species of sulfides. Hence, the treatment process involving potassium hydroxide (KOH) together with the sodium hydroxide achieves a more complete reaction with all of the sulfides contained in the hydrocarbon based liquids in comparison to just using a concentrated solution of sodium hydroxide.

In such proposed treatment process for remediating contaminated liquids, the treatment solution may be added at a standard dosage rate of 0.25-6.0 ml of the treatment solution/liter of the liquid being treated, preferably 1.0-5.0 ml of the treatment solution/liter of the liquid being treated, which corresponds to approximately 250-6000 ppm of the treatment solution in the liquid being treated based on the discussed concentration of hydroxide(s) in the solution. The discussed standard dosage rate is generally effective for remediating $H_2S$ concentrations up to down to safe, acceptable levels. 40,000 ppm $H_2S$ may be experienced in some hydrocarbon based liquids such as crude oil, although contaminated aqueous solutions typically have a much lower $H_2S$ concentration such as 2000 ppm or less. If the amount of the treatment solution added is below 0.25 ml/liter of liquid being treated, sufficient remediation of $H_2S$ may not be archived, and the reactions between the treatment solution and the sulfide compounds in the hydrocarbon based liquid may not proceed quickly and/or efficiently. If the concentration of $H_2S$ is higher than 40,000 ppm it may be necessary to increase standard dosage amount of the recently proposed treatment solution appropriately, which may generally involve linear scalability. Dosage levels above 6.0 ml of the treatment solution/liter of the liquid being treated generally do not further reduce $H_2S$ levels in the treated liquids where reaction times are not a consideration, but can advantageously reduce required reaction times if so desired.

Within the discussed standard dosage rate range, a most appropriate dosage amount of the treatment solution to be added to a contaminated liquid during the treatment process may be determined based on a few considerations, e.g., the amounts of $H_2S$ and other contaminants in the liquid that need to be remediated, other characteristics of the liquid including its viscosity or API density (the term API as used herein, is an abbreviation for American Petroleum Institute), desired reaction rate/time, specific result desired including whether precipitate(s) are to be formed and released from the liquid, and whether the treated liquid is being mixed and/or heated during the treatment process. For example, mixing at moderate to high speeds to rapidly disperse the treatment solution throughout the treated liquid may reduce required reaction time by 50%, whereas some highly viscous liquids such as bunker fuel may require heating to permit proper dispersion of the treatment solution therein. The appropriate dosage rate is substantially, linearly scalable in relation to most or all of the various characteristics within the standard dosage rate range.

Advantageously, the recently proposed treatment process is generally efficient and effective as long as the amount of the treatment solution added is within the discussed standard dosage rate range, whether or not the amount of treatment solution added is the most appropriate dosage amount for the given liquid being treated. Further, use of higher amounts of the treatment solution may be desirable in some situations, and generally will not cause any significant problems or complications, although higher dosage amounts generally tend to cause precipitate(s) to be generated and released from the treated liquids. For example, the inventor has further determined that if an intentionally excessive dosage of the recently proposed treatment solution is added to a liquid being treated such as 2-5 times the standard dosage rates discussed above, this will likely cause remediated contaminants and other contaminants in the treated liquid to precipitate out of the treated liquid, which may be desirable in some situations. Also, depending on how much of the treatment solution is used in excess of the standard dosing rate, this may generate different precipitates which separate out of the treated liquid so that the outcome may be controlled in desired manners, e.g., at 2 times the standard dosing rate a hydrate of sodium sulfide such as $Na_2S.9H_2O$ may precipitate out of the treated liquid according to the reaction (2) above, while at a higher dosage rate of 3 to 5 times the standard dosage rate, this may cause elemental sulfur to precipitate out of the treated liquid. Otherwise, the excess dosages of hydroxides in the treatment process will increase the cost of the treatment, but generally do not have any significantly adverse effects on the treated hydrocarbon based liquids and aqueous solutions. However, application of a very excessive amount of the solution, e.g., ten times the normal amount, may render the treated petroleum based liquid caustic which could be damaging to metals such as steel and aluminum used for containing and transporting the treated liquids.

Reaction times for the inventor's recently proposed treatment process are typically within a relatively short time period such as 15 minutes-24 hours after such treatment solution is added to the liquid at the discussed dosage rate, whether the liquid being treated is a hydrocarbon based liquid such as crude oil or a contaminated aqueous solution. Within such time period, the hydroxide(s) in the solution remediate the $H_2S$ and other sulfur based contaminants down to safe, acceptable levels such as 5 ppm or less, and without generating or releasing any particularly harmful substances. For example, when the treatment solution includes sodium hydroxide (NaOH) as the primary hydroxide therein, e.g., at least 90% of all hydroxides in the solution, much of the $H_2S$, e.g., at least 60% is converted into sodium bisulfide (NaHS) according to the reaction (1) above, which remains dissolved in the treated petroleum liquid, and does not create any significant problems that would need to be addressed. Additionally, some of the $H_2S$ may be converted into sulfur dioxide ($SO_2$) gas which may be released from the treated petroleum based liquid, depending on the pressure at which the treated liquid is kept.

Very desirably, the proposed treatment process is generally not reversible in relation to the $H_2S$ and other sulfur contaminants which have been remediated, e.g., even if the treated liquid is heated up to 180° F. for a period of days or weeks, any remediated sulfur compounds remaining in the treated liquids do not revert back to $H_2S$. Some conventional treatment processes for remediating $H_2S$ are undesirably reversible, including the conventional amine treatment process which uses an amine such as MEA or triazine for treating $H_2S$ in crude oil. For example, with the conventional amine treatment process, while the $H_2S$ may be initially remediated or abated down to acceptable levels, the sulfur contained in the treated oil may undesirably revert back to $H_2S$ over time, especially if the treated oil is heated. Conversely, when crude oil which initially contained about 1000 ppm $H_2S$ was treated according to a treatment process using the treatment solution according to the inventor's recent proposal at a dosing rate of 3 ml/liter of oil and the $H_2S$ was abated down to about 0 ppm and essentially none of the sulfur precipitated out of the oil, the treated crude oil was heated up to 180-300° F. or 82.2-148.9° C. for periods of hours, days and weeks, the resulting oil still contained about 0 ppm $H_2S$. Essentially none of the sulfur compounds(s) in the treated liquid reverted back to $H_2S$.

According to a second proposal by the present inventor, the first proposed treatment composition and process are modified or supplemented such that the contaminants in the treated liquids are not only remediated, but remediated in such a manner that essentially no precipitates or scale are generated in the treated liquids. In the first proposed treatment process if only a standard dosing rate of the treatment solution is added to a liquid being treated, there may be little or no precipitate(s), scaling or the like formed from the treated liquids, but even small amounts of precipitate(s), scaling or the like may be undesired or unacceptable in some situations. One particular application in which it is very important to assure that no precipitates, scale and the like will be generated from the treated hydrocarbon based liquids is when crude oil directly from the ground is being transported via tanker truck or other vessel to a major pipeline, which then transports the crude oil to a refinery. The major pipeline generally will not accept crude oil containing more than 5 ppm $H_2S$. By treating the crude oil with a standard dosage of the treatment solution according to the inventor's first proposal, this would be effective to reduce the WS content down to 5 ppm or less, but it is possible that there would be some precipitates and/or scaling formed or deposited on surfaces of the tanker truck or other vessel transporting the crude oil, which would be undesirable.

According to the inventor's second recent proposal, an appropriate amount of organic acid(s) such as fulvic acid and humic acid is also added to the treated liquid at a dosage rate of MEA acts as an anti-scaling agent in the second proposed treatment process/composition.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

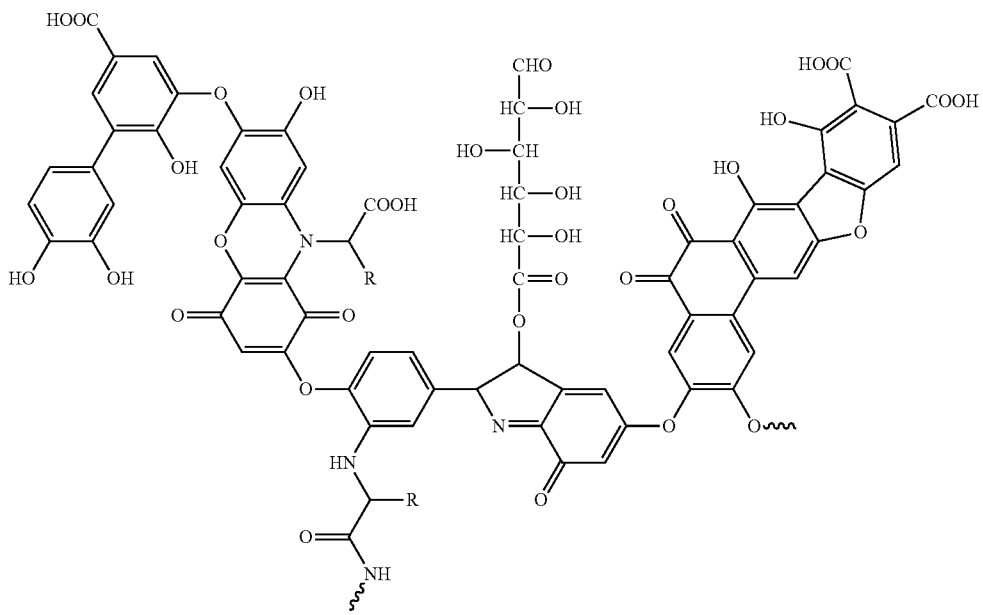

that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. Within such range, the most appropriate dosage rate of the organic acid(s), like the most appropriate dosage rate of the first recently proposed treatment solution, largely depends on: 1) the amount of $H_2S$ and other sulfur containing contaminants in the liquid being treated; 2) the viscosity of the liquid; and 3) the amount of time permitted for reacting the treatment solution with the liquid being treated, although heating and/or mixing of the liquid being treated will reduce the viscosity of the liquid and will also reduce the amount of time required for properly remediating the $H_2S$ and other contaminants in the liquid. The dosage amount of organic acid(s) is substantially, linearly scalable within the discussed range based on these factors. Additionally, a small amount of monoethanolamine or MEA ($C_2H_7NO$) may be added to the treated liquid, along with the organic acid(s), e.g., an amount corresponding to a concentration of 0.5-15 ppm, and preferably 1.0-10 ppm, of the MEA in the hydrocarbon based liquid or aqueous solution being treated. The small amount In the treatment process according to the second proposal the organic acid(s) which are also added to the liquids being treated assure that substantially no precipitate(s), scaling or the like will be formed from the treated liquids while they are being treated, transported and/or stored for a period of time such as hours, days or weeks. Further, to any extent that there is a increased likelihood that precipitate(s), scaling or the like may be formed in a treated liquid, e.g., the treated liquid contains an especially high content of $H_2S$ and other sulfides requiring a larger dosage of the treatment solution according to the inventor's recent proposal and/or the liquid being treated contains a high content of rag components such as organic matter, an increased amount of the organic acid(s) may be added to the treated liquid beyond the normal range of 0.01-10 ppm to assure that substantially no precipitate(s), scaling or the like will be formed.

The inventor's recently proposed treatment processes may be conveniently carried out essentially wherever the contaminated liquids may be present, e.g., in open bodies of the liquids, in conjunction with a transport tanker or other vessel in which the liquids are being transported, at a wellhead where the liquids are being extracted from the ground, in open or closed tanks, in an enclosed pipeline through which the contaminated water or other liquid is being transported, etc.

While the known treatment methods and compositions for remediating sulfur-containing compounds, including $H_2S$, from hydrocarbon based liquid and aqueous solutions, especially the methods and treatment compositions according to the present inventor's recent proposals are generally effective for remediating the $H_2S$ and other contaminants in the liquids, they cannot be similarly applied in relation to treatment of contaminated gasses such as natural gas as the nature of remediation of the contaminants is more complicated. Such contaminated gasses often contain significant amounts of other contaminants in addition to $H_2S$, e.g., carbon dioxide ($CO_2$), nitrogen ($N_2$), water ($H_2O$), sodium chloride (NaCl), etc. It is desirable that all or most of these contaminants be remediated as the gas is withdrawn from the well, or within a short time thereafter, although a final remediation may be performed at a refinery or the like. Of course, the nature of natural gas is much different from the nature of crude oil and other liquids, including that natural gas is typically, continuously discharged from a well at significant velocities, pressures and volumes, it is handled and processed much differently than liquids, the value of natural gas on volume basis is much less than crude oil, etc., and this creates additional complications for treating contaminated gasses. For example, a typical oil well will discharge 5 to 30,000 barrels of crude oil and 1-2 million $ft^3$ of natural gas/day. Further, with contaminated liquids the time involved in a treatment process for remediation of contaminants may be an hour or more, but this is typically not a problem as the treatment composition may be simply mixed or provided with the contaminated liquid and then let sit for the time required for the $H_2S$ and other contaminant(s) in the liquid to be remediated. On the other hand, a treatment process for remediating a contaminated gas such as natural gas may only permit contact between the treatment composition and the contaminated gas for a few seconds. Further, some of the contaminants in the natural gas may tend to generate significant amounts of precipitates, which can greatly affect the treatment process. In fact, the natural gas extracted from many existing wells around the world are so highly contaminated with $H_2S$, as well as other contaminants including water, salts, $CO_2$, etc., that conventionally known treatment processes and treatment compositions for treating the natural gas to remediate the contaminants therein are not sufficiently, effective and/or efficient, whereby it has been economically impractical to treat such highly contaminated natural gas so that it may be sold and used. While some states and nations previously permitted the contaminated natural gas to be simply burned/flared as it is extracted from the wells, in order to extract the crude oil that is discharged from the wells along with the natural gas, many states and nations no longer permit such burning/flaring of the contaminated natural gas due to environmental concerns. Hence, many existing wells now remain capped and idle, which is astonishing as the cost of drilling and establishing a typical oil well may be 10 million dollars or more.

Thus, there remains in the art a need for treatment systems, treatment methods and treatment compositions for remediating contaminants such as $H_2S$, other sulfur based contaminants, $CO_2$, salts, water, $N_2$, etc., in natural gas and other gasses, including highly contaminated gasses, where the treatment systems and methods are practical in terms of effectiveness and cost. There is a need for such treatment systems, methods and compositions which are improved in terms of effectiveness in completely remediating the contaminants down to government regulated levels or lower, as well as in terms of efficiency in quickly remediating the sulfide compounds and other contaminants at a reasonable cost, and with good flexibility in the ability to perform the treatment method at essentially any location, including directly at a well head or an oil field where crude oil or natural gas is being extracted.

SUMMARY OF THE INVENTION

An object of the present invention is to satisfy the discussed need.

The present inventor has carefully investigated caustic treatment of petroleum based gasses including natural gas, as well as other contaminated gasses for removing $H_2S$ and other contaminants therefrom, and has discovered some new treatment systems, methods and compositions for efficiently remediating the contaminants in such gasses.

One discovery made by the present inventor is that when his previously proposed treatment compositions are used for treating a large volume of a highly contaminated gas which is flowing, e.g., natural gas which is being extracted from well and which contains significant amounts of $H_2S$ and other contaminants, simply flowing/bubbling the contaminated gas through the treatment compositions may not be an efficient or practical method for remediating the contaminants. While the inventor's previously proposed treatment solutions are effective for remediating the $H_2S$ and other contaminants in the gasses down below government accepted levels, the treatment solutions and the treatment processes may become much less effective in a relatively short time, such as 4-12 hours of use, due to other contaminants in the natural gas besides $H_2S$ and to the nature of the treatment process for natural gas. This makes the cost of the treatment process itself very high in terms of the treatment solution having to be replaced every 4-12 hours, as well as shutting down and restarting the process every few hours. Moreover, it is no simple, inexpensive task to stop and re-start the flow of natural gas and other fluids from a well.

In relation to the discovery, the inventor has discovered that there are multiple complications involved with the problem. A main complication is that some of the contaminants in the natural gas, such as Na and Cl ions from salts, may generate significant amounts of precipitates that released from the natural gas as it is being treated and clog up components of the treatment system and the treatment process. For example, if natural gas contains a significant amount of sodium chloride (NaCl), e.g., any water vapor contained in the natural gas will typically be saturated with Na and Cl ions and these ions combine as sodium chloride NaCl which tends to precipitate out of the natural gas as it is being treated and quickly build up to a significant amount in 1-6 hours. Such precipitates tend to greatly disrupt the treatment process and would have to be removed on a regular basis, again, making the treatment process more complicated and inefficient. Such precipitation of sodium chloride occurs even if the treatment process uses a treatment solution according to the inventor's proposal in PCT/US2018/064015, which includes an organic acid such as fulvic acid or humic acid that helps to prevent formation of precipitates in treated liquids/fluids. Another complication is that some of the contaminants interfere with remediation of the $H_2S$ and other targeted contaminants, inhibiting and slowing down the remediation and requiring additional treatment composition to be used to achieve the desired level of remediation. Still another complication is the nature of the natural gas which is to be treated with a liquid treatment composition, and the velocity, pressure and volume at which natural gas is discharged from a well. For the contaminants that are to be remediated, including $H_2S$, there must be sufficient contact between the contaminants and the hydroxides and other reactants in the treatment composition and this is very difficult or impossible to achieve if the natural gas is flowing at a high velocity, such 10 feet/sec. or more.

The inventor has further studied the treatment of contaminated gasses in light of the discovered complications, and the inventor has further discovered novel treatment systems, treatment processes and treatment compositions that address and overcome each of the complications discussed above and provide a very practical, effective and efficient manner of remediating contaminated natural gas and other contaminated gasses.

According to an aspect of the present invention, the inventor has determined that the first complication pertaining to formation and release of precipitates may be overcome by initially treating the contaminated gas to remove the contaminants most likely to generate precipitates, including Na and Cl ions. This may be done, for example, by passing the contaminated gas through a water wash flow cell of potable water to remove such ions which are very soluble in water. The inventor has performed testing of the effects of a water wash flow cell on contaminated natural gas obtained from a well, after the natural gas is initially separated from the crude oil and contaminated water that is discharged with the natural gas from the well, and has found that the water wash very effective for removing these contaminants from the contaminated gas, e.g., testing showed that the after the water wash the gas contained an undetectable amount of Na and less than 0.03 ppm of Cl. Removal of the contaminants most likely to generate precipitates, including Na and Cl ions, not only prevents formation of precipitates, but the inventor has also discovered that it also synergistically improves the efficiency of the treatment composition that remediates $H_2S$ and $CO_2$ according to an embodiment of the present invention as discussed further herein.

According to another aspect of the present invention, the inventor has determined that the second complication pertaining to interference to remediation of primary targeted contaminants including $H_2S$ by other contaminants in the gas may largely be overcome by also removing most of the water ($H_2O$) in the natural gas before the treatment for remediation of $H_2S$ and other targeted contaminants. Generally, contaminated natural gas from a well may contain trace amounts of water up to 5% volume, and after passing through a water wash flow cell the natural gas will typically contain at least 2% volume of water. It is possible to remove water from the natural gas using a variety of conventional means, e.g., a glycol tower, a coalescing or dehydrating unit which causes water vapor in the gas to liquefy and drop out, etc. The conventional means may be appropriate for use according to the exemplary embodiments of the present invention, but the inventor has determined that it is important to reduce the water content to a very low level, e.g., less than 1 ppm, and more preferably ≤0.5 ppm in the natural gas, because even low levels of water can add up to significant quantities over a period of 24 hours (one day) in the treatment of natural gas flowing from a well, and the water will, among other things, dilute the treatment composition which remediates $H_2S$ and other targeted contaminants according to the exemplary embodiments of the present invention, and this undesirably makes the treatment process less efficient by increasing necessary reaction times, etc. For example, with an average size well discharging about 2 million ft of natural gas/day at 125-150 PSI, if the natural gas contains 2 ppm of water, this amounts to more than barrels of water/day in the natural gas, whereas in the exemplary treatment process according to an embodiment of the invention the amount of treatment compositions used may be less than one barrel.

Additionally, because water is one of the byproducts resulting from remediation of $H_2S$ and other targeted contaminants using the exemplary treatment compositions according to the exemplary embodiments of the present invention, the inventor has further determined that it is also very beneficial to remove water from treatment compositions being used in the reactor throughout the treatment process in order to achieve even better efficiency. The water can be removed periodically, e.g., when the amount of water in the treatment composition reaches a predetermined level, or continuously. For example, some amount of the treatment composition may form a pool in a bottom portion of a reaction chamber of the reactor and from that pool some amount, e.g., 1-20% volume, may be withdrawn and heated to a temperature at which the water will vaporize but which does not otherwise adversely affect the treatment composition, e.g., 240-400° F., the evaporated water can be drawn off and then the dehydrated treatment composition returned to the reaction chamber.

According to another aspect of the present invention, the inventor has determined that the third complication, pertaining to the nature of the natural gas which is to be treated with a liquid treatment composition and the high rate at which natural gas is extracted from a well, may largely be overcome by: regulating the pressure of the natural gas to an appropriate level which will correspond to a flow rate or velocity of the natural gas being remediated to less than 10 feet/sec, preferably to ≤5 feet/sec, as it passes through one or more reactors sufficiently sized to handle all of the gas being discharged from the well; and disrupting the flow of the natural gas through the reactor(s) so that the gas cannot flow uninterrupted therethrough in a stream or as large bubbles, and will thereby have much more surface area for reacting with the treatment composition. Such disruption may be accomplished by packing the reactor(s) or portions thereof with a fine, non-reactive media, e.g., stainless steel wool, pea gravel, perforated plates, etc., through which the natural gas will pass as it flows through the reactor(s). Additionally, the inventor has determined that for optimum efficiency, it is desirable that the reactor should not be filled to any extent with the treatment composition, e.g., as a bubble tower, but instead may be operated as a counter-flow type reactor in which the natural gas is continuously introduced near the bottom of the reactor and the treatment composition is continuously introduced at intermediate and/or upper portions of the reactor so as to wet or saturate the non-reactive media and so that the natural gas will contact and react with the treatment composition as it flows upward through the reactor. With such a counter-flow reactor, some of the treatment composition will remain in the treated natural gas along with the remediated contaminants as the natural gas exits the reactor, and some of the treatment composition may descend to a bottom portion of the reactor and accumulate based on gravity. The amount of treatment composition remaining in the natural gas as it exits the reactor may be minimized by providing some type of baffle, e.g., perforated plate(s), before the reactor exit that the natural gas will contact and which will separate any small droplets of treatment composition from the natural gas and permit same to drip back down into the reactor. The amount of treatment composition which descends into and accumulates at the bottom portion of the reactor may be used as the source for withdrawing some of the treatment composition to be dehydrated by removing accumulated water, which dehydrated composition may then be re-circulated back into the reactor as discussed herein.

According to another aspect of the present invention, based on a substantial amount of experimentation the present inventor has discovered a new treatment composition that works exceptionally well for remediating HIS and other targeted contaminants typically contained in natural gas extracted from the earth. The new treatment composition includes some components that are also in the previously proposed treatment composition disclosed in PCT/US2018/064015 for treating contaminated liquids such as crude oil, and these components perform similar functions when treating the contaminated natural gas. For example, a concentrated aqueous hydroxide solution with 35-55 wt % of one or more hydroxide compounds is used as the main component, e.g., at least 80 wt % and preferably at least 90 wt %, of the new treatment composition, and the aqueous hydroxide solution reacts with and remediates $H_2S$ and other targeted contaminants in the contaminated gasses. Additionally, the new treatment composition may include a small amount, e.g., 0.1-2 wt % of an organic acid such as fulvic acid or humic acid which functions to prevent any precipitates from being generated and released from the treated gasses. Additionally, the new treatment composition according to an exemplary embodiment of the present invention may also include, for example, a small amount, e.g., 0.1-3 wt %, of a chelating agent such as ethylenediaminetetraacetic acid or EDTA ($C_{10}H_{16}N_2O_8$), which among other things helps to improve molar reactivity of the hydroxide compound(s) and helps to prevent formation of precipitates, and smaller amounts of a surfactant and a buffering agent.

Relative to the hydroxide compound(s) used in the treatment composition, it is preferable to use only hydroxide compound(s) which do not contain element(s)/component(s) that are also included as a significant contaminant in the gas being treated. For example, if the gas contains a significant amount of sodium chloride as a contaminant, then the hydroxide compound(s) in the treatment solution should be other than sodium hydroxide (NaOH), e.g., potassium hydroxide (KOH), lithium hydroxide (LiOH), magnesium hydroxide ($Mg(OH)_2$), and manganese hydroxide ($Mn(OH)_2$, $Mn(OH)_4$) would be suitable hydroxides for use in this situation. Of course, with the Na and Cl ions being initially removed in the water wash, it would be possible to use sodium hydroxide as a hydroxide compound in the treatment solution.

Relative to the carbon dioxide ($CO_2$) in the natural gas, this can be remediated with the hydroxide compound(s) in the treatment composition according to the exemplary embodiment of the invention, and theoretically this would require an additional amount of the treatment composition to be used in the remediation process. For this reason, the present inventor considered the possibility of removing $CO_2$ from the natural gas before it is treated with the treatment composition in the counter-flow reactor, e.g., by a scrubbing process, or by addition of carbonate compounds in the treatment composition to reduce reactivity of hydroxides in the treatment composition with $CO_2$. However, the inventor further discovered that when the Na and Cl ions are initially removed from the natural gas using the water wash and because the treatment composition is highly basic with a pH of 13-14, such that the pH of the natural gas is increased from an initial value of about 5.8-6.2 to a pH. of at least 7 when it contacts the treatment composition, this has a synergistic effect whereby some of the $H_2S$ and $CO_2$ in the natural gas react together to form, among other things, hydroxide ion $OH^-$, which will then help to efficiently, remediate other $H_2S$ and $CO_2$ in the natural gas. Hence, while is possible to initially scrub $CO_2$ from the natural gas before the gas is remediated using the treatment composition of the present invention or to add carbonates to the treatment composition to reduce reactivity with $CO_2$, the treatment process according to the present invention can efficiently remediate the $CO_2$ content in the natural gas down to 1 ppm or less without separately scrubbing the $CO_2$ using an additional scrubbing process or adding carbonates to the treatment composition.

With the new treatment composition according to the exemplary embodiment of the present invention as used in a treatment system and process according to the above discussed aspects of the present invention, including a water wash flow cell to remove Na, Cl ions, a device for initially removing water from the natural gas, and a counter-flow reactor, the present inventor has successfully remediated the $H_2S$ and other targeted contaminants in natural gas, including mercaptans, thiophene and other disulfides, $H_2O$, $CO_2$, NaCl and nitrogen ($N_2$) down to less than 1 ppm each in a small scale operation, and without generation of any precipitates from the treated natural gas in the counter-flow reactor. It is expected that in a full scale operation, e.g., including a counter-flow reactor with a 2 ft ID and 21 ft tall, and at least 6 ft of which is packed with non-reactive media, a continuous flow of natural gas from a well at 2 million $ft^3$/day, including 2,000-100,000 ppm $H_2S$ and other contaminants may be successfully treated down to less than 1 ppm for each of the contaminants by regulating the pressure of the gas within a range of 50-250 psi to assure that the gas flows at less than 10 feet/second, and preferably ≤5 feet/second, and using 1-4 gallons/hour or 24-96 gallons total/day of the treatment composition according to the exemplary, embodiment. Overall, such a treatment process is practical because it is very effective and cost efficient for remediating even highly contaminated natural gas, unlike all known, conventional treatment processes existing prior to the present invention. The natural gas as treated using the treat lent composition and treatment process according to the exemplary embodiment of the present invention is so clean, that it may be directly sold as sweet natural gas without further processing. Similarly, it may be directly condensed into liquefied petroleum gas (LPG) in the vicinity of the well from which it is extracted. In such liquefied state the gas may be very economically stored and transported.

Intent of Disclosure

Although the following disclosure of exemplary embodiments of the invention offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Exemplary embodiments of the present invention will be described below. Primary aspects of the present invention involve use of novel treatment compositions in treatment compositions for remediating contaminated gasses such as natural gas from a well.

Processes for Treating Contaminated Gasses Including Natural Gas from a Well

The present inventor has spent much time investigating possible treatment compositions and treatment processes for treating natural gas, including natural gas which is highly contaminated, and has discovered novel treatment compositions, treatment systems and treatment processes which are very effective and efficient for treating contaminated natural gas such that the contaminants therein are quickly remediated down to acceptable levels, even when the natural gas is highly contaminated with high levels of $H_2S$ and other contaminants, and whereby the treatment process is practical from an economic point of view, e.g., the cost of the treatment process together with the cost of extracting the natural gas from the earth is far less than the market value of the remediated natural gas.

Figure 1:
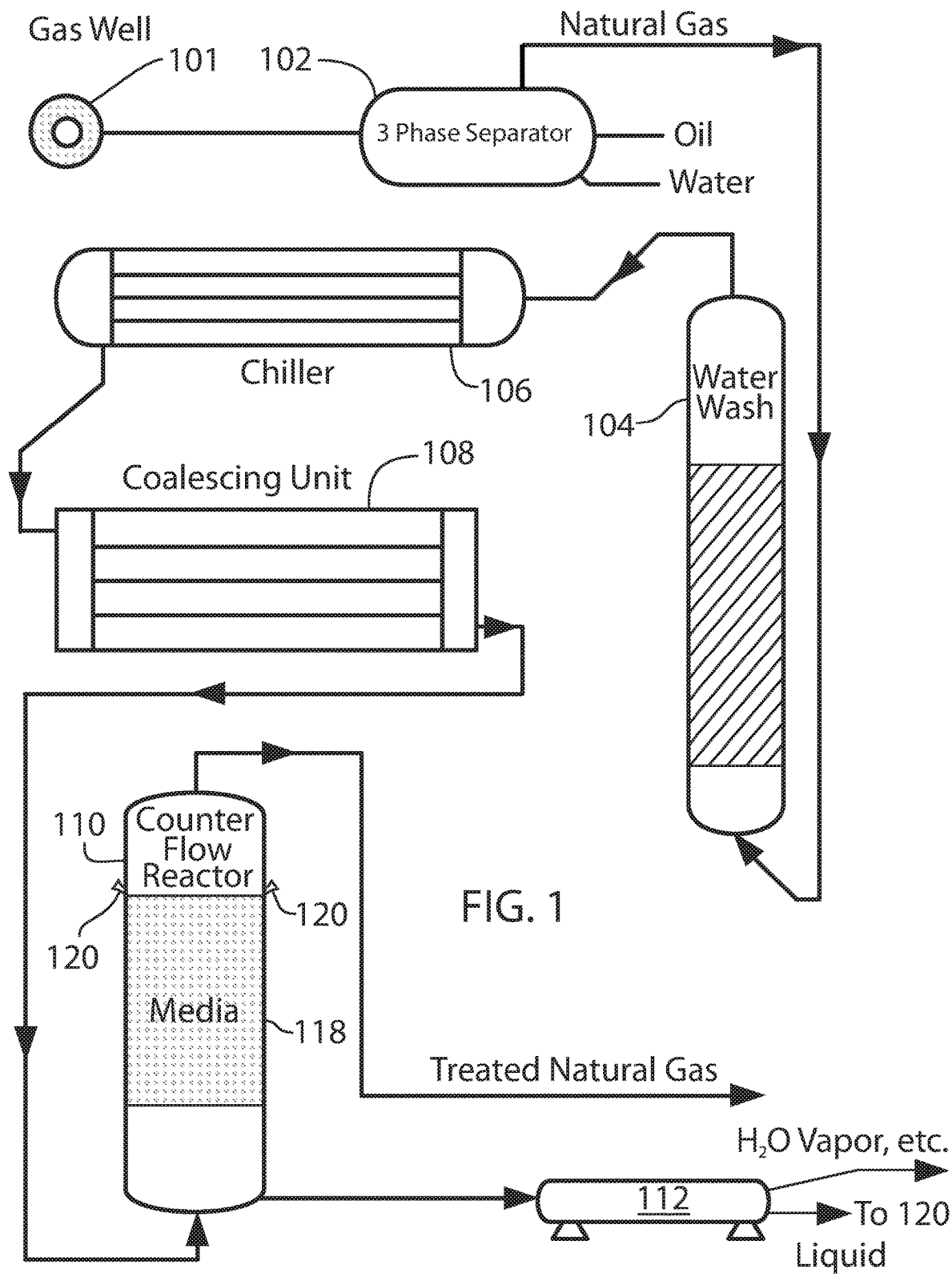
FIG. 1 is a schematic diagram of a treatment system which may be used in an exemplary embodiment of the present invention.
Figure 2:
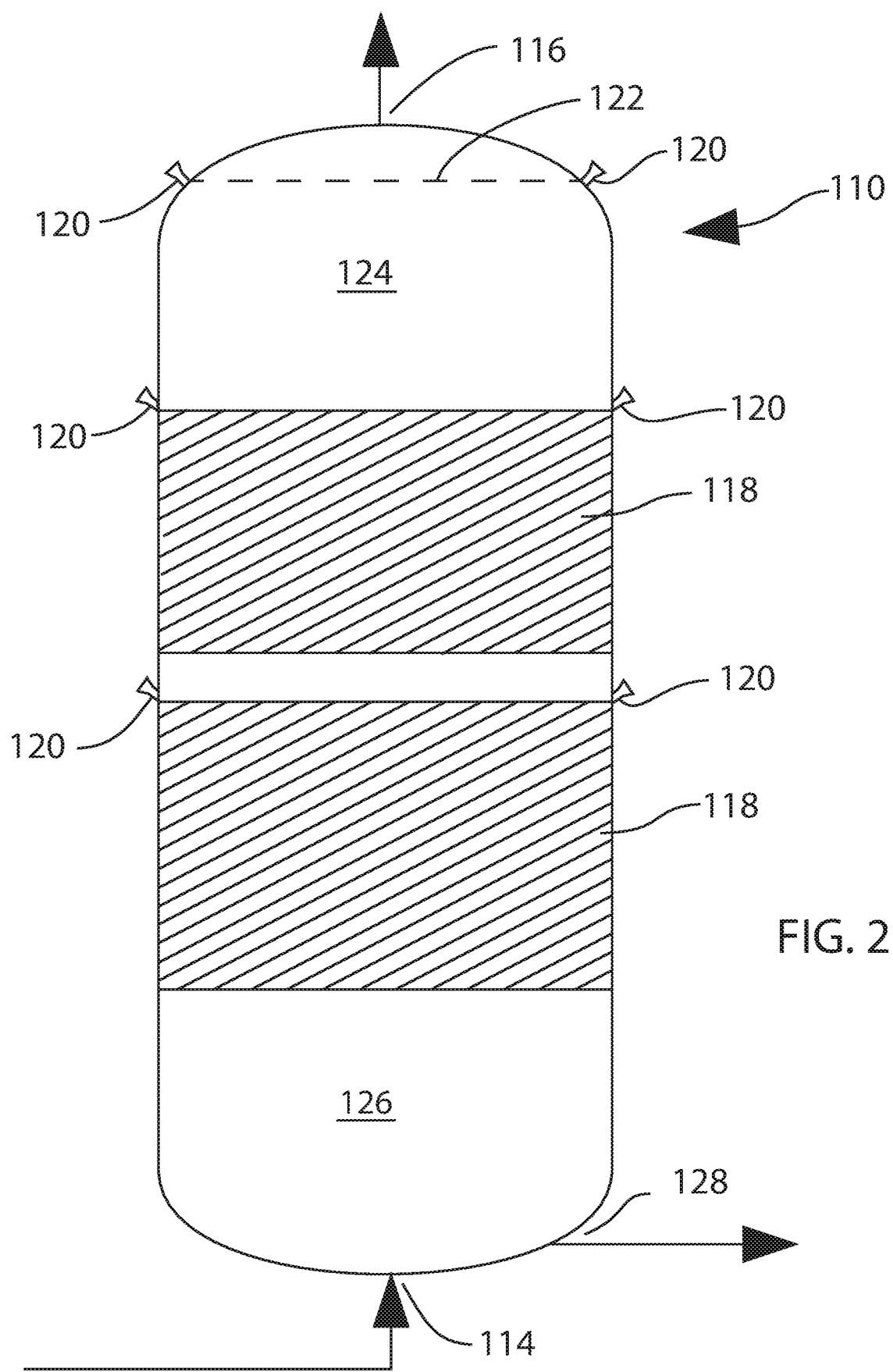
FIG. 2 is a cross sectional view of a counter-flow reactor according to an exemplary embodiment of the present invention.
Figure 3:
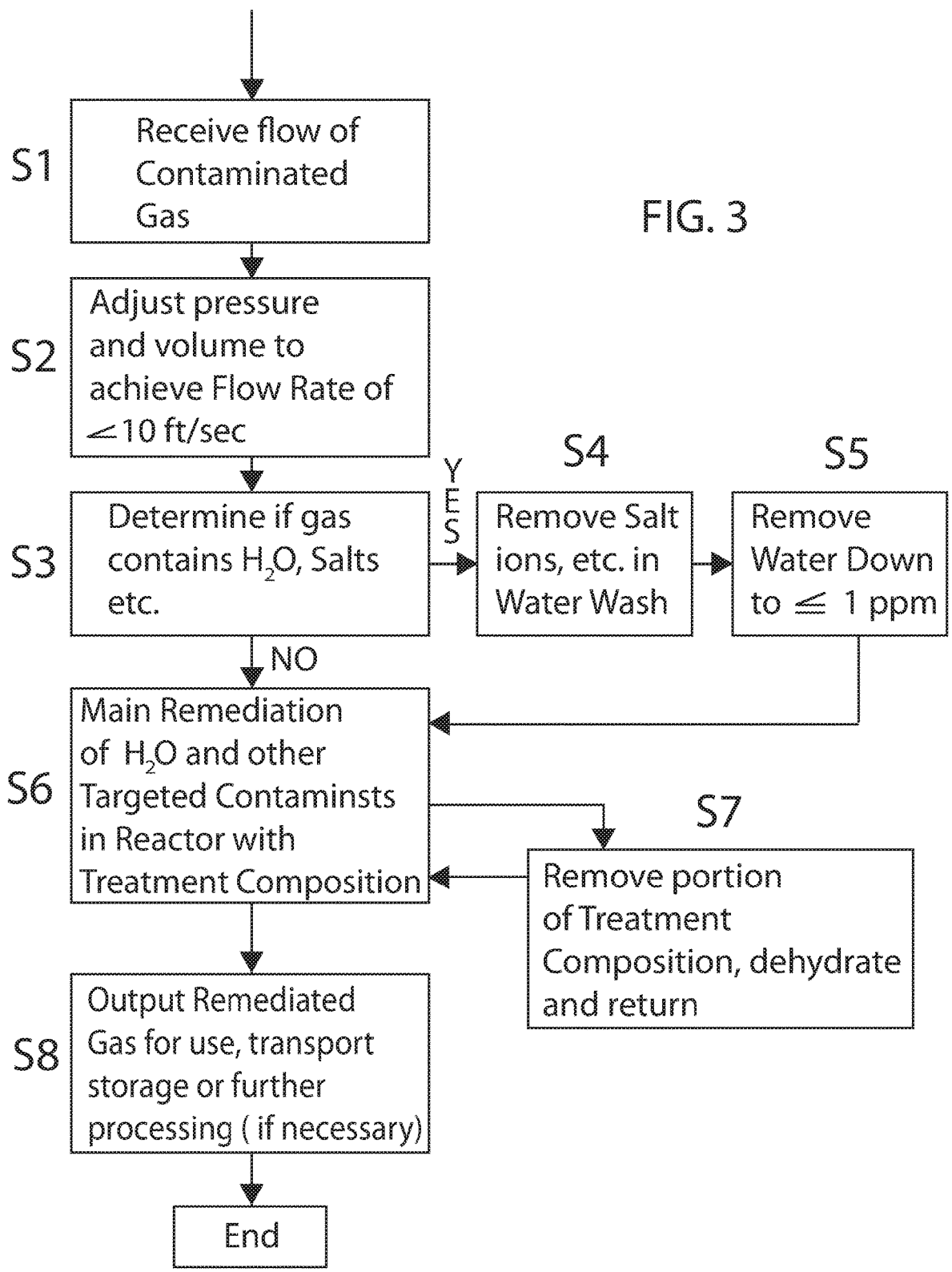
FIG. 3 is a flow chart of a natural gas remediation process according to an exemplary embodiment of the present invention.

Referring to FIGS. 1-3, there are respectively shown a system 100 for remediating contaminated natural gas according to an exemplary embodiment of the present invention, an enlarged view of a counter-flow reactor 110 in the system 100, and a flowchart of a treatment method or process using the system 100 according to an exemplary embodiment of the present invention. The system 100 may include a three phase separator 102 which receives the fluids output from a well 101 and separates same into a gas stream, a aqueous based liquid stream and a hydrocarbon based liquid stream, a water wash flow cell 104, a chiller 106, a coalescing unit 108, a counter-flow reactor 110 with injectors 120 for injecting treatment composition, a dehydrator 112 and possibly other and/or additional components as discussed herein.

The three phase separator 102 is a component that is conventionally used to separate the three main types of fluids that are extracted from an oil well, i.e., gases and vapors including natural gas, crude oil and so-called "produced water", all of which contain contaminants, and is conventionally in close proximity to a well for separating the different components promptly after they are discharged from the well. In one day a typical oil well yields 5 to 30,000 barrels of oil, about 7-8 times as much produced water as oil and 1 million to 2 million cubic feet (ft) of natural gas, and may have a regulator which reduces discharge pressure to about 100 to 300 psi. In the separator flow of the fluids is slowed to give the fluids retention time in the separator whereby the three fluid will naturally separate from each other based on characteristics thereof, with the gasses, vapors and contaminants therein being discharged at an upper portion of the separator. The rest of the components of the system 100 are uniquely combined according to the exemplary embodiment of the present invention, which may also be located in close proximity to the well or elsewhere if desired. Through the investigations, the inventor has discovered various complications relating to treatment of contaminated natural gas, and has also determined that the most effective and efficient manner of remediating the natural gas is to separately remove or remediate different ones of the contaminants using respective processes that are effected by different components of the system 100. Collectively, the components of the system 100 can be used to achieve a very effective and efficient treatment process for remediating the contaminated natural gas such that the treated gas satisfies all governmental regulations for levels of contaminants, even to the point that the remediated natural gas may be directly used for heating and the like or condensed into LPG without further processing.

As part of the investigations the inventor attempted to remediate natural gas containing high levels of $H_2S$, e.g., 20,000 ppm and above, as well as various levels of some other sulfur based contaminants, $CO_2$, $N_2$, $H_2O$, and NaCl using the previously proposed treatment compositions as discussed in PCT/US2018/050913 and PCT/US2018/064015 by placing the compositions in an elongate, bubble tower type reactor and bubbling or flowing the contaminated natural gas up through the treatment compositions, and discovered several complications relating to same. While the previously proposed treatment compositions were initially very effective for remediating the $H_2S$ and other contaminants in the natural gas down to acceptable levels below 5 ppm, the treatment compositions and such treatment process tend to become much less effective in a relatively short time, such as 4-12 hours of use, due to several complications. Although the effectiveness of the system could be generally maintained by replacing the treatment composition and cleaning out the system regularly, e.g., every few hours, this is not practical as it would greatly increase the cost of the treatment process in terms of the amount of treatment composition required, as well as greatly reduced productivity in the amount of natural gas that may be treated by the system per unit of time and costs associated with repeatedly stopping and re-starting the flow of natural gas and other fluids from a well. In fact, the complications discovered by the inventor tend to reflect why all conventional treatment processes for remediating highly contaminated natural gas that existed prior to the present invention are unacceptable as a practical matter, and whereby there are many existing wells around the world that are now just remaining in an unused—shut in state because the cost of the conventional treatment processes does not justify doing anything to remediate the highly contaminated natural gas from such wells. Previously, some nations and states permitted highly contaminated natural gas to be simply burned/flared as a least expensive means of obtaining crude oil that is extracted from the wells with the natural gas, but due to environmental concerns many states and nations no longer permit this.

Regarding the complications which the inventor has discovered relating to the remediation of natural gas, a main complication is that some of the contaminants often found in the natural gas, such as salts and carbonates, may generate significant amounts of precipitates that are released from the natural gas as it is being treated and clog up components of the treatment system. Natural gas extracted from wells around the world may contain little or no water and no associated salt that would be dissolved in the water, which wells are referred to as dry wells, and such gas may not require additional processing steps to remove these contaminants. However, many wells will contain some amount of water, e.g., 0.001 to 8.0% volume, and any such water will typically be saturated with Na and Cl ions from salt such as NaCl because salt is prevalent in the earth where oil and natural gas are extracted, and salts are highly soluble in water, and whereby the natural gas may contain 1-15% weight of NaCl. The inventor has discovered that when natural gas having water with Na and Cl ions therein is remediated in a conventional treatment system, e.g., by passing the gas through a bubble tower filled or partly filed with the treatment compositions, these ions combine as sodium chloride NaCl which tends to precipitate out of the natural gas as it is being treated and may quickly build up to a significant amount in 1-6 hours. Such precipitates can greatly disrupt the treatment system process by plugging up flow lines and the like, and would have to be removed on a regular basis, again, making the treatment process more complicated and inefficient. The inventor further discovered that such precipitation of sodium chloride occurs even if the treatment process uses a treatment solution according to the inventor's proposal in PCT/US2018/064015, which includes an organic acid such as fulvic acid or humic acid, that helps to prevent formation of precipitates in treated liquids/fluids. Another complication which the inventor discovered is that some of the contaminants typically present in the natural gas interfere with remediation of the HIS and other targeted contaminants in various manners, which undesirably inhibit and slow down the remediation process and which may require excess treatment composition to be used and/or to a longer contact time between the natural gas and the treatment composition in order to remediate the contaminants down to acceptable levels. Still other complications include the gaseous nature of the natural gas which is to be treated with a liquid treatment composition, and the high pressure, flowrate and volume at which natural gas is discharged from a well. For the contaminants that are to be remediated there must be sufficient contact between the contaminants in the gas and the hydroxides and other reactants in the treatment composition, but this is very difficult or impossible to achieve if the natural gas is flowing at high flow rate or velocity of ≥10 feet/second when they contact the treatment composition liquid.

Again, the inventor has extensively studied the treatment of contaminated gasses in light of the discovered complications, and the inventor has further discovered the novel treatment system, novel treatment process and novel treatment composition according to exemplary embodiments of the present invention that address and overcome each of the discussed complications, and provide a very effective, efficient and practical solution for remediating contaminated natural gas and other contaminated gasses, involving the treatment system 100 and the treatment process of the exemplary embodiment of the invention as shown in FIGS. 1-3.

The inventor has determined that the first complication pertaining to formation and release of precipitates may be overcome by initially treating the contaminated gas to remove the contaminants most likely to generate precipitates, including Na and Cl ions from salt and carbonate ions. With reference to FIG. 1, this may be done, for example, by passing the contaminated natural gas from the three phase separator 102 through the water wash flow cell 104 to remove such ions which are highly soluble in water. The water wash flow cell 104 may include an elongate chamber having an amount of clean or potable water therein. For assuring a sufficient contact time between the water and the natural gas as it passes through the water wash flow cell, the flow rate or velocity of the gas may be controlled down to an appropriate level of less than 10 feet/sec., preferably ≤5 feet/sec. Additionally, some non-reactive means for breaking up the flow of the natural gas into small bubbles or the like, e.g., bubbles having an average size ranging from about 1-50 milliliters, may be provided within the chamber of the flow cell for increasing the contact area between the gas and the water as it passes through the chamber, e.g., perforated baffles, pea gravel or the like, stainless steel wool media, etc. The inventor has performed testing of the effects of a water wash on contaminated natural gas obtained from a well, after the natural gas is initially separated from the crude oil and contaminated water in the separator 102, and have found that after passing though the water wash flow cell at an appropriate velocity and with means for breaking up the flow of the natural gas into small bubbles or the like the contaminated gas contained an undetectable amount of Na and less than 0.03 ppm of Cl. Generally, the salt content of the water in the water wash flow cell 104 may be monitored to assure that it is below a predetermined threshold, and the water may be replaced as necessary when the amount of salt ions and other ions in the water, extracted from the natural gas, becomes too high. Alternatively, some portion of the wash water may be replaced on an ongoing basis to prevent the salt content thereof from becoming too high.

Removal of the contaminants most likely to generate precipitates, including Na, Cl and $CO_3$ ions, not only prevents formation of precipitates, but the inventor has also discovered that it also synergistically improves the efficiency of the treatment composition that remediates $H_2S$ and $CO_2$ according to an embodiment of the present invention as discussed further herein.

The inventor has determined that the second complication pertaining to interference to remediation of primary targeted contaminants including WS by other contaminants in the gas may largely be overcome by also removing most of the water ($H_2O$) the natural gas before the treatment for remediation of $H_2S$ and other targeted contaminants with the treatment composition according to the exemplary embodiment. Contaminated natural gas directly from some wells may contain trace amounts of water up to about 5% volume, and after passing through the water wash flow cell 104 the natural gas will typically contain at least 2% volume of water. In the natural gas industry gas containing less than 0.5 ppm water is considered as dry gas, while gas having any water content of 0.5 ppm or above is considered wet. It is possible to remove water from the wet natural gas using a variety of conventional means, e.g., a glycol tower, a coalescing or dehydrating unit which causes water vapor in the gas to liquefy and drop out, a candescent absorbent which absorbs the moisture from the natural gas, etc. One or more of the conventional means may be appropriate for use according to the exemplary embodiments of the present invention, e.g., the embodiment of the invention shown in FIG. 1 includes a chiller 106 and a coalescing or dehydrating unit 108, although use of the coalescing or dehydrating unit 108 may be sufficient without the chiller 106. The inventor has determined that for present embodiment of the treatment system and process it is important to reduce the water content to a very low level, e.g., less 1 ppm, preferably less than 0.5 ppm in the natural gas in order to avoid the undesired complications. Even low levels of water, e.g., 1-2 ppm, in the natural gas can add up to significant quantities over a period of 24 hours (one day) in the treatment of natural gas flowing from a well, e.g., for an average size well discharging about 2,000,000 $ft^3$ of natural gas/day, if the natural gas contains 2 ppm of water, this amounts to more than 7 barrels of water/day in the natural gas. In contrast, an amount of treatment solution according to the exemplary embodiment of the present invention needed to properly remediate and other targeted contaminants in 2,000,000 $ft^3$ of natural gas down to government regulated levels or lower may be less than one barrel, as discussed further herein. Hence, 1-2 ppm of water in the natural gas will, among other things, significantly dilute the treatment composition, and this undesirably makes the treatment process less efficient and less effective at remediating the contaminants by increasing necessary reaction times, causing the reactive components in the treatment composition to become prematurely spent, reducing pKa protonic strength of the treatment composition, etc.

Additionally, the inventor has also discovered that because water is one of the byproducts resulting from remediation of $H_2S$ and other targeted contaminants using the treatment compositions according to the exemplary embodiments of the present invention, it is also very beneficial to remove water from treatment compositions throughout the treatment process in order to achieve optimum treatment efficiency. The water can be removed from the treatment composition periodically, e.g., when the amount of water in the treatment composition reaches a predetermined level, or continuously, e.g., with a closed loop arrangement of withdrawing, dehydrating and returning some amount of the treatment composition from the reactor 110 at a controlled flow rate. For example, an amount of the treatment composition in the counter-flow reactor 110, e.g., 1-20% volume, may be withdrawn and subjected to a dehydration process in a dehydrator 112 or other appropriate device which removes the water, and then returned into the counter-flow reactor 110 through injectors 120. A dehydrator is basically a steam boiler in which a liquid volume is held in a heating chamber of the boiler with a controlled heat source to heat the chamber to a desired temperature, e.g., in the treatment process according to the exemplary embodiment of the present invention 240° F. to 400° F. would be appropriate, where the liquid treatment composition is heated to the point that the water and some other contaminants which have been taken up by the treatment composition, including $CO_2$, sulfides, etc. are vaporized or otherwise dissociated from the composition and vented off, but the treatment composition itself is not adversely affected because it has a much higher boiling point than 240° F. to 400° F. By such dehydration process the treatment composition is effectively regenerated back to a degassed acid base, similar to its original reactive condition. The present inventor has tested the pKa of some of the treatment composition according to the exemplary embodiment of the present invention which has been regenerated via a dehydration process such as discussed above, and such testing shows that the acid base chemical had lost only 2/100ths of a point in pH concentration in comparison to its original value.

The inventor has determined that the third complication, pertaining to the nature of the natural gas which is to be treated with a liquid treatment composition and the high flow rate or velocity at which natural gas is extracted from a well, may largely be overcome by: appropriately controlling the flow rate or velocity of the natural gas as it passes through the counter-flow reactor 110, though appropriate regulation of the pressure of the natural gas and appropriate sizing of the ID of the reactor to achieve a flow rate or velocity of the natural gas through the counter-flow reactor 110 of less than 10 feet/sec., preferably ≤5 feet/sec.; and disrupting the flow of the natural gas through the reactor so that the gas cannot flow uninterrupted therethrough in a stream or as large bubbles, and will instead be in the form of small or very small bubbles, e.g., average size ranging from about 1-50 milliliters, having much more surface area for reacting with the treatment composition. At flow rates above 10 feet/sec. the flowing gas will pass through the liquid treatment composition by largely forcing the liquid out of the gas' flowpath, and while making insufficient contact with the treatment composition to achieve the desired remediation of $H_2S$ and other targeted contaminants. Additionally, at flow rates above 10 feet/sec. some of the contaminants in the natural gas may precipitate out of the natural gas, which would cause undesirable complications such as discussed above in relation to Na and Cl ions. A gas flowrate of less than 10 feet/sec., preferably ≤5 feet/sec. is typically, appropriate for assuring sufficient contact between the gas and the treatment composition as it passes through the counter-flow reactor 110. Disruption of the gas flow as it passes through the reactor 110 may be accomplished by various means such as packing the reactor or portions thereof with a non-reactive media such as indicated at 118 in FIGS. 1-2, e.g., stainless steel wool, pea gravel or the like, perforated plates, etc., through which the natural gas must pass as it flows through the reactor(s). For example, if the reactor 110 provides contact between the treatment composition, as disposed with the non-reactive media 118 in the reactor, and the natural gas through a length of 12 feet and a flowrate or velocity of the natural gas as it passes through the reactor is about 5 feet/sec., the gas will take about 2.4 seconds to pass through the media as saturated with the treatment composition. Through testing, the present inventor has determined that a contact time of at least 1.5 seconds between the natural gas and the treatment composition, as disposed with the non-reactive media 118, according to the exemplary embodiment of the present invention should be sufficient to assure that the $H_2S$ and other targeted contaminants are remediated down to less than 0.25 ppm in the natural gas in the exemplary treatment system of the present invention, even for natural gas having very high concentrations of $H_2S$ of 100,000 and more, provided that the flow rate of gas as it passes through the counter-flow reactor 110 is 5 feet/sec. or less and a flow disrupting means is provided in the reactor. Additional contact time beyond 1.5 seconds will remediate the contaminants even further. Hence, 2.4 seconds of contact time in the discussed example should be appropriate for assuring sufficient contact time to achieve remediation of the contaminants to levels below the government requirements.

Additionally, the inventor has determined that for optimum efficiency, it is desirable that the reactor should not be filled to any extent with a standing column of the treatment composition only, excluding the treatment composition as disposed with the non-reactive media 118, because this tends to cause the treatment composition to be much less efficient for remediating the targeted contaminants, e.g., the gas tends to pass through the column of treatment composition in larger size bubbles and to take excess amounts of the composition with the gas as it exits the reactor. Although a conventional bubble tower type reactor having a column of liquid treatment composition therein and through which the natural gas simply flows may be effective for remediating natural gas using the treatment process and treatment composition according to the exemplary embodiment of the present invention, it would not be the most efficient. The inventor has determined that for achieving greater efficiency, it is much better to use a counter-flow type reactor 110 with the non-reactive media 118 in the treatment system and process according to the exemplary embodiment of the invention.

Referring to FIG. 2, a counter-flow reactor 110 of the present embodiment may be an elongate reactor extending vertically having an inlet 114 at a bottom portion thereof where the natural gas is introduced into the reactor, an upper exit 116 from which the treated natural gas is discharged from the reactor, non-reactive media 118 which is provided in one or more sections of the reaction chamber within the reactor as flow disrupting means and through which the gas must pass as it flows through the reactor, various injectors 120 which inject a treatment composition according to the invention embodiment into the reactor such that the composition wets and saturates the non-reactive media 118 throughout a treatment process according to the invention embodiment, a baffle 122 provided near the upper exit 116 which the natural gas must contact before it reaches the exit, and a lower discharge 124 from which treatment composition that accumulates in the bottom portion of the reactor may be withdrawn for dehydration and reuse.

The section(s) of non-reactive media 118 may be provided at intermediate portion(s) of the reactor 110, with an open space 126 at a bottom section of the reactor below the media, an open space 124 above the media, and open spaces(s) between sections of the media as shown, and may be collectively be at least six feet long in the vertical direction to assure sufficient contact time between the natural gas and the treatment composition in the reactor. If additional contact time is desired, e.g., for assuring more complete remediation of contaminants, the length of the reactor 110 and/or the section(s) of the non-reactive media 118 may be increased, and/or a gas flow rate or velocity of the gas through the reactor may be reduced by appropriately regulating the pressure of the natural gas and/or adjusting the ID of the reactor 110. While it would be ideal if none of the treatment composition accumulates as a pool in the reactor, e.g., by very carefully controlling the amount of treatment composition injected into the reactor so that it only wets and saturates the non-reactive media without having any excess composition dripping from the media, as a practical matter such control would be difficult and expensive to achieve, so that there will typically be some accumulation of the composition in the open space 124 in order to assure that sufficient contact is made between the natural gas and the treatment composition with the non-reactive media 118, Hence, the open space 126 may have a sufficiently long vertical dimension and/or the accumulated composition may be withdrawn at an appropriate rate so as to prevent any accumulated pool of composition from contacting a lower surface of the non-reactive media 118. The open space 124 and baffle 122 at the upper section of the reactor permit some or most of any treatment composition retained by the treated natural gas to be separated from the gas and drop back into the reactor before the gas is discharged through exit 116, and the vertical length of the open space and/or the number and types of baffles may be selected to achieve this purpose accordingly.

The injectors 120 for injecting treatment composition into the reactor 110 may be provided in any desired number and arrangement, but with the objective of injecting the treatment composition into the reactor such that the non-reactive media may be continuously wetted and saturated with the composition throughout the treatment process so that the gas will have continuous contact with the composition as it passes through the non-reactive media 118, but without over-saturating the media with the composition to any greatly excessive extent, e.g., such that the amount of excess treatment composition dripping from the media 118 is kept to a minimum. Thus, for example, multiple injectors 120 may be provided at different vertical levels of the reactor and in spaced relation around the reactor so as to inject the composition onto and/or into the media 118 in each section thereof, and/or one or more injectors 120 may be provided in an upper portion of the reactor which inject or spray treatment composition down onto the non-reactive media, and gravity will force the treatment composition will flow down through the media. The injectors 120 may inject the composition as very fine droplets and may include some type of atomizing nozzle for such purpose.

The pressure of the gas entering the reactor 110 may be regulated and/or the ID of the reactor adjusted so that the gas flows upward through the reaction chamber at a rate of 10 feet/sec. or less, and preferably 5 feet/sec. or less, while the treatment composition as introduced at intermediate and/or upper portions of the reactor through the injectors 120 flows downward based on gravity at about 0.987 feet/sec., thus establishing a counter-flow of the gas and the treatment composition in the reactor. In terms of the rate at which the liquid treatment composition is introduced into the counter-flow reactor 110, this largely depends on the amount of natural gas being treated in the reactor over a given time period, corresponding to the flowrate or velocity, pressure and density of the natural gas as it passes through the reactor, as well as the types and amounts of contaminants in the natural gas. Again, enough of the treatment composition should be introduced into the reactor that it fully wets and saturates the non-reactive media 118, but without greatly over saturating the media. In an ideal setting, an optimum amount of treatment composition will be used to fully the remediate contaminants in the natural gas, and the remediated contaminants will remain in the treated natural gas as it exits the reactor, as well as the spent treatment composition, so that nothing accumulates in the reactor. Again, in real life things rarely work ideally, so that the media 118 will likely be over-saturated to some extent, some amount of the treatment composition will accumulate in the bottom portion of the reactor, and some small liquid droplets of the treatment composition which is still reactive will remain in the treated natural gas along with the remediated contaminants as the natural gas exits the reactor. The amount of treatment composition remaining in the natural gas as it exits the reactor may be minimized by providing the baffle 122 in close proximity to the reactor exit so that the natural gas will contact the baffle 122 before exiting the reactor, and such contact may separate some or most of the treatment composition from the natural gas and permit same to drip back down into the reactor. The amount of treatment composition which descends into and accumulates at the bottom portion of the reactor may be used as the source for withdrawing some of the treatment composition at discharge 128 so that it may be dehydrated and then re-circulated back into the reactor as discussed above.

Based on a substantial amount of experimentation, the present inventor has discovered a new treatment composition that works exceptionally well for remediating $H_2S$ and other targeted contaminants typically contained in natural gas extracted from the earth, including many other species of sulfides, disulfides, thiols, mercaptans such as ethyl mercaptan, $CO_2$, $N_2$, etc. The new treatment composition may also be used to treat other contaminated gasses besides natural gas. An exemplary embodiment of the new treatment composition according to the present invention includes some components that are also in the previously proposed treatment composition disclosed in PCT/US2018/064015 for treating contaminated liquids such as crude oil and so-called produced water that is extracted with crude oil, and these components perform similar functions when used as components of the treatment composition for treating contaminated gasses including natural gas. For example, a concentrated aqueous hydroxide solution may also be used as the main component of the exemplary embodiment of the treatment composition according to the present invention, e.g., at least 80 wt % and preferably at least 90 wt %, of the new treatment composition, with the aqueous hydroxide solution containing collectively 35-55 wt %, and preferably 45-55 wt %, of one or more hydroxide compounds. The aqueous hydroxide solution is very effective for reacting with and remediating $H_2S$ and other targeted contaminants in the contaminated gasses. As another example, a smaller amount, e.g., 0.1-2 wt % of an organic acid such as fulvic acid or humic acid may be provided as part of the exemplary embodiment of the new treatment composition. As in the treatment composition of PCT/US2018/064015, such organic acids function to prevent any precipitates from being generated and released from the treated gasses. The inventor does not know exactly how such organic acids prevent formation of precipitates, but based on the research he has done he believes that these organic acids effectively encapsulate or combine with the remediated sulfur based compounds and other contaminants which are dissolved in the treated gasses and prevent these from changing phase to a solid or crystal form which would precipitate out of the treated natural gas, even as the pH of the treated gas is changed. As still another example, a small amount of MEA, e.g., 0.1-3 wt %, may be included in the treatment composition as an anti-scaling agent similarly to the treatment composition of PCT/US2018/064015. In addition to components of the composition of PCT/US2018/064015, the new treatment composition according to an exemplary embodiment of the present invention may also include some other ingredients, including a small amount, e.g., 0.5-4 wt %, of ethylenediaminetetraacetic acid or EDTA ($C_{10}H_{16}N_2O_8$) which is a type of chelating agent that, among other things, helps to improve molar reactivity of the hydroxide compound(s) and helps to prevent formation of precipitates, and smaller amounts, e.g., 0.01-0.1% volume, of a surfactant such as sodium lauryl sulphate and a buffering agent such as potassium carbonate, etc. Of course, higher proportions of the organic acids, MEA, chelating agent, surfactant and buffering agent may be used in the treatment composition if desired, but the inventor has determined that any additional advantageous effect that may be achieved by increasing the proportions may not justify the additional cost.

Relative to the hydroxide compound(s) used in the treatment composition, it is preferable to use only hydroxide compound(s) which do not contain element(s)/component(s) that are also included as a significant contaminant in the gas being treated. For example, if the gas contains a significant amount of sodium chloride as a contaminant, then the hydroxide compound(s) in the treatment solution should be other than sodium hydroxide (NaOH), e.g., potassium hydroxide (KOH), lithium hydroxide (LiOH), magnesium hydroxide ($Mg(OH)_2$), and manganese hydroxide ($Mn(OH)_2$, $Mn(OH)_4$) would be suitable hydroxides for use in this situation. Of course, if most of the Na and Cl ions are initially removed from the natural gas in the water wash according to the exemplary embodiment of the treatment process, it would be possible to use sodium hydroxide as a hydroxide compound in the treatment composition, but it would still be desirable to use other hydroxide compound(s) to avoid possible complications.

An exemplary formulation of the treatment composition according to the present invention includes the following components, which may be combined;

1) 1.0 liter of aqueous hydroxide solution containing ≥1 hydroxide compound, excluding NaOH, at a collective concentration of 35-55 wt %, and preferably at least 45 wt %;
2) 0.1-3 wt % of ≥1 organic acid such as fulvic acid or humic acid/liter of aqueous hydroxide solution;
3) 0.5-6 wt % of EDTA/liter of aqueous hydroxide solution;
4) 0.01-0.1 wt % of sodium lauryl sulfate as a surfactant/liter of aqueous hydroxide solution; and
5) 0.01-0.1 wt % of potassium carbonate a buffering agent/liter of aqueous hydroxide solution.

Relative to the carbon dioxide ($CO_2$) in the natural gas, this can be remediated with the hydroxide compound(s) in the treatment composition according to the exemplary embodiment of the invention, and theoretically this would require an additional amount of the treatment composition to be used in the remediation process. For this reason, the CO could be removed from the natural gas before it is treated with the treatment composition in the counter-flow reactor 110, e.g., by a scrubbing process. Another possibility would be to add a significant amount of carbonate compound(s) such as potassium carbonate ($K_2CO_3$) and/or sodium bicarbonate ($NaHCO_3$) to the treatment composition to saturate it with carbonate ions, so that the hydroxides in the treatment composition would not react with $CO_2$ to create more carbonate ions.

However, the inventor further discovered that due to certain aspects of the treatment process according to the exemplary embodiment of the present invention, the exemplary embodiment of the treatment composition is synergistically very effective and efficient at remediating the $CO_2$, as well as the $H_2S$ and other targeted contaminants in the natural gas without any additional process or component to specially remediate or address the $CO_2$. Particularly, the inventor has discovered that because the Na and Cl ions are initially removed from the natural gas using the water wash flow cell 104 according to the exemplary embodiment and because the treatment composition is highly basic with a pH of 13-14, the pH of the natural gas is increased from a typical initial value of about 5.8-6.2 to a pH of at least 7 when it contacts the treatment composition in the reactor 110, and this has a synergistic effect for remediating both the $H_2S$ and $CO_2$ in the natural gas. Particularly, when the pH of the natural gas reaches 7.0 and higher in the absence of Cl ions, these conditions favor a reaction between some of $H_2S$ and $CO_2$ in the contaminated gas which forms, among other things, hydroxide ion ($OH^-$). Of course, hydroxide ion is already the main reactant of the treatment composition from the aqueous hydroxide solution, and the additional amount of hydroxide ion generated by the reaction of $H_2S$ and $CO_2$ then helps to efficiently remediate other remaining $H_2S$ and $CO_2$ in the contaminated gas. Hence, while is possible to initially scrub $CO_2$ from the natural gas or modify the treatment composition by addition of carbonate compound(s) before the natural gas is remediated using the treatment composition in the reactor 110, the treatment process using the treatment composition according to the exemplary embodiment of the present invention can efficiently and advantageously remediate the $CO_2$ content in the natural gas down to 1 ppm or less without such additional process or modification.

With the new treatment composition according to the exemplary embodiment of the present invention as used in a treatment process according to the above discussed aspects of the present invention, including a water wash flow cell 104 to remove Na, Cl ions, a device for initially removing water from the natural gas, and a counter-flow reactor 110, the present inventor has successfully remediated the $H_2S$ and other targeted contaminants in natural gas, including mercaptans, thiophene and other disulfides, $H_2O$, $CO_2$, NaCl and nitrogen ($N_2$) down to less than 1 ppm each in a small scale operation, and without generation of any appreciable amount of precipitates from the treated natural gas in the counter-flow reactor, as confirmed by testing of the treated natural gas. Moreover, the testing did not otherwise indicate anything about the treated natural gas that would make it unacceptable under government regulations or such that it has any characteristic that would render it as less than high quality, sweet grade natural gas. For example, the pH of the remediated natural gas is around 7.0 or slightly above 7.0, while the remediated contaminants and any remaining treatment composition remaining in the remediated natural gas do not adversely affect the quality of the gas.

Generally, a well for extracting crude oil and natural gas from the earth may have an inside diameter (ID) of about 4 inches, while the well may be drilled to an average depth of 30,000 to 50,000 feet, at which depth temperature may be about 1000° F. and pressure may be 100 to 2500 PSI. Some wells have pump jacks and some do not, and for those that do not they will have regulators which reduce the pressure down to about 300 PSI at the surface well head. A typical well will yield 1 to 2 million $ft^3$ of natural gas/day at 100 PSI and 120° F. If a well produces 2 million $ft^3$ of natural gas/day at such pressure and temperature and the gas is passed through a pipe with a 3 inch ID, the flow rate or velocity of the gas would be about 68 feet/sec. At such velocity it would be impossible to remediate the natural gas in a reactor according to the present exemplary embodiment because the gas would rapidly pass through the treatment composition with little contact. However, the counter-flow reactor 110 may have an ID of any appropriate size, e.g., 1-6 feet ID, and the pressure of the gas may be adjusted or regulated to any desired pressure, including pressures above 100 PSI, at which the gas will have a reduced volume and increased density compared to the volume and density at or below 100 PSI, such that all of the natural gas extracted from a well could be properly handled by one or more of the reactors 110 which are appropriately structured to receive the gas so that it passes through the reactor(s) at a velocity of ≤5 feet/sec. For example, 2 million $ft^3$ of natural gas at 100 PSI and 120° F. being discharged from a well through a pipe with an ID of 3 inches is treated in a reactor having an ID of 2.0 feet, and gas pressure adjusted to 120 PSI with a corresponding reduction in volume, the gas velocity through the reactor would be about 5 feet/sec., and if the pressure is increased to 200 PSI with a corresponding reduction in volume, the gas velocity through the reactor would be about 0.9 fee/sec. Generally, the pressure and density of the natural gas do not significantly affect the effectiveness of the remediation process according to the exemplary embodiment of the present invention. In other words, the remediation process is effective for reducing the contaminant levels down to government acceptable levels or lower regardless of the pressure and density of the gas, as long as the flow rate or velocity of the gas through the reactor 110 is less than 10 feet/sec., preferably ≤5 feet/sec.

Based on all testing thus far, it is expected that in a full scale operation, e.g., including a counter-flow reactor with a 2 ft ID and 21 ft tall, and at least 6 ft of which is packed with non-reactive media, a continuous flow of natural gas from a well at 2 million $ft^3$/day, including high concentrations of $H_2S$, e.g., 2,000-300,000 ppm, and other contaminants may be successfully treated down to less than 1 ppm for each of the contaminants using 1-4 gallons/hour or 24-96 gallons total of the treatment composition provided the pressure of the gas is maintained within a range of 100-200 PSI and velocity of the gas is less than 10 feet/sec., preferably ≤5 feet/sec. according to the exemplary embodiment. The specific formulation and/or amount of treatment composition used may be appropriately adjusted based on specific characteristics of the natural gas and operations of the different components of the treatment system 100 to achieve a desired result. Of course, the counter-flow reactor 110 and other components of the exemplary treatment system 100 in FIGS. 1-2 may be constructed in any suitable size appropriate for treating any given amount of natural gas being output from a well. Similarly, it is also possible to use multiple systems 100 to handle the natural gas from a given well.

Referring to FIG. 3 there is shown a treatment process for remediating $H_2S$ and other contaminants in natural gas and other gasses according to an exemplary embodiment of the present invention, and it generally corresponds to the exemplary treatment system 100 of FIG. 1. At step S1 a flow of a contaminated gas is received, e.g., a flow of contaminated natural gas from the separator 102 after it has been separated from the crude oil and produced water. At step S2 the pressure and volume of the flow of natural gas is adjusted such that the flow rate or velocity of the gas will be less than 10 feet/sec., preferably ≤5 feet/sec, as the treatment process continues. At step S3 it is determined whether the contaminated gas contains water and/or chemicals that are likely to precipitate from the treated gas in amounts such that these contaminants should be initially removed, and if YES, the contaminated gas is treated in the water wash flow cell 104 to remove ions of chemicals such as Na, Cl and $CO_3$ at step S4 and/or in step S5 is treated remove water down to less than 1 ppm, preferably ≤0.5 ppm, e.g., in the coalescing unit 108 and optionally the chiller 106. If the answer at S3 is NO or after the chemicals and water are removed in steps S4, S5, at step S6 the flow of contaminated gas is then passed through a reactor such as the counter-flow reactor 110 where $H_2S$ and other targeted contaminants are remediated using the treatment composition, e.g., the treatment composition is injected via nozzles 120 to saturate the non-reactive media 118 so that the gas will flow through the saturated media in the form of very small bubbles, e.g. average size ranging from about 1-50 milliliters, for at least 1.5 seconds. At step S7 some portion of the treatment composition in the reactor is removed, some of the water and possibly some other contaminants that have combined with the treatment composition are removed, e.g., by processing the treatment composition in the dehydrator 112, and the dehydrated treatment composition is injected back into the reactor, along with additional new treatment composition. Finally at step S8, the treated natural gas as discharged from the reactor is sold, burned, transported to a refinery for further processing, or otherwise processed for transport and/or storage. Additionally, while not shown in FIG. 3, sensors will be provided in association with different components of the treatment system and various parameters of the treatment process may be monitored to make sure the contaminants are being properly remediated and that the various components of the system are operating properly, and if necessary appropriate adjustments may be made to keep the treatment process operating in an efficient manner.

The treatment process according to the exemplary embodiment may conducted at various temperatures, including ambient up to 200° F., and may be conducted at various pressures, but for purposes of efficiency and given the flow rate, pressure and volume of natural gas from a well it may be desirable to conduct the treatment process at pressures significantly above ambient, e.g., 50-300 PSI, as the volume and velocity of the natural gas is reduced as pressure goes up, whereas the treatment system, process and composition according to the exemplary embodiment of the invention remains very effective at remediating the contaminants down to very low levels even as the pressure increases. The treatment process according to the exemplary embodiment may conducted in a continuous, partly continuous manner or batch manner, although for very large volumes of gas such as natural gas coming out of a well, batch manner may not be practical. A continuous or partly continuous treatment processes may involve flowing a continuous stream of the gas through the system 100 for any given period of time, e.g., hours, days, weeks, etc., and the longer the treatment process may continuously proceed while sufficiently remediating the contaminants in the gas, the more efficient and cost effective the process will be.

Overall, the treatment process according to the exemplary embodiment of the present invention is very effective and cost efficient for remediating contaminated gasses, including highly contaminated natural gas. Again, in a small scale operation the present inventor has determined that $H_2S$ and other targeted contaminants in natural gas, including mercaptans, thiophene and other disulfides, $H_2O$, $CO_2$, NaCl and nitrogen ($N_2$) are remediated down to less than 1 ppm each, and it is expected that the same excellent results will be achieved in larger scale operations of the invention. In contrast, no conventional treatment composition/system/process existing at the time of the present invention has proven sufficiently effective and efficient to remediate highly contaminated natural gas, and has resulted in many existing wells being currently unused and shut in, which is significant given that the average cost to put in one such well is several millions of dollars. In fact, the highly contaminated natural gas as remediated using the treatment composition, treatment system and treatment process according to the exemplary embodiment of the present invention is so clean relative to all of the contaminants originally therein, that it may be directly sold as sweet natural gas without further processing, which creates new, advantageous possibilities for efficiently and economically handling the natural gas. For example, the remediated natural gas may be directly condensed into liquefied petroleum gas (LPG) in the vicinity of the well from which it is extracted, by locating necessary equipment in the vicinity of the well to process the gas directly after it is discharged from the treatment system of the invention. As will be appreciated, being able to directly liquefy the natural gas in the vicinity of the well, and without having to first transport same to a refinery or the like for further processing, permits the gas to be very economically stored and transported.

Examples of Treatment Process

The inventor has conducted a study is to determine the behavioral effects based on temperature and pressure of natural gas containing significant amounts of various contaminants that are typically found in natural gas, including Na, Cl, $H_2S$, $CO_2$, $H_2O$ and carbonates. These contaminates pose many challenges to remediation of same, e.g., overdosing, formation and release of precipitates, etc. Also, it is important to understand that the natural gas being extracted via different wells, and even the natural gas extracted from a given well at different times, will contain different contaminants and different levels of contaminants. Correspondingly, it is desirable and advantageous that the treatment system, process and composition according to the exemplary embodiment can effectively and efficiently remediate essentially any natural gas regardless of the types and amounts of contaminants therein.

The study was performed using a natural gas sample obtained from Lilis Antelope site in a 500 gallon bulk methane tank at pressure 135 PSI. The gas was tested and found to contain, among other contaminants, 50,000 ppm $H_2S$, 2% $H_2O$ vapor saturated with Na, Cl ions. A small scale version of many components of the treatment system 100 was constructed, including: a water wash flow cell 4 inch ID PVC×5 ft long, volume of water 3.0 gallons for removing the Na, Cl ions; a bendix air dryer, 5.20 ft$^3$/min., self purging for reducing water content down to 0.5 ppm; and a counter-flow reactor 4 inch stainless steel×5 feet long, of which 4 feet are packed with stainless steel wool media. For a first run of the study the water wash flow cell did not include any non-reactive media for breaking up the flow of the natural gas, but in subsequent runs of the study a section of the reactor was packed with stainless steel wool, non-reactive media. A treatment composition according to the exemplary formulation above was injected into the counter-flow reactor such that the stainless steel wool media would be saturated with same. Additionally, a gas flow regulator with an $H_2S$ monitor was provided to monitor the $H_2S$ content of the treated natural gas after it leaves the counter-flow reactor.

The first run of the study was performed at 60 to 65° F. at ambient pressure and a flow rate of 4 ft$^3$/hour for periods of 2 to 3 hours at a time, totaling a combined run of 8 hours total. The $H_2S$ in the gas was remediated down to 0 ppm or non-detectable for the complete run. However, 6 hours in to the run salts and carbonate solids formed plugging the system supply lines. The primary cause of this problem was determined to be that the water wash became ineffective at the 6 hour such that significant amounts of salt and carbonate ions remained in the natural gas and then precipitated out in other components of the system.

This study was run again in similar manner except the pressure was increased to 80 PSI with the same temperature conditions, the flow rate was increased to 1 ft$^3$/minute for a period of 4 hours and the non-reactive media was provided in the water wash flow cell. For this run it was noted that no significant amounts of precipitates were released from the gas and did not plug up any components of the system, and the $H_2S$ in the gas was again remediated down to 0 ppm or non-detectable for the complete run. Another similar run of the study used the same temperature and pressure, but increased the flow rate to 5 ft$^3$/minute for a period of 4 hours. Again, the water wash remained effective for removing salt and carbonate ions from the gas for the time total of 8 hours in these two runs of the study. Analytical testing was done on the water wash and gas after the runs of the study and the results were as follows.

After the first 6 hrs run at atmospheric pressure the water in the water wash flow cell contained 1% sodium and 5.47 ppm chlorides, while the natural gas discharged from the water wash flow cell contained 3% water vapor. After the two runs at 80 PSI pressure for a total of 8 hrs the water in the water wash flow cell contained 1% sodium and 7.367 ppm chlorides, while the natural gas discharged from the water wash flow cell contained 3% water vapor. The treated natural gas discharged from the counter-flow reactor after the initial run at atmospheric pressure contained 60 to 85 ppm $H_2S$ compared to the original 50,000 ppm. To bring the $H_2S$ content down to 0 ppm or non-detectable, five cycles of 20 ml each of additional treatment composition were injected into the counter-flow reactor to saturate the stainless steel wool media in the reactor. The natural gas as discharged from the counter-flow reactor would remain at 0 ppm for one hour and 20 minutes after such injection of additional treatment composition before the $H_2S$ content of the discharged gas would return to 60 to 85 ppm. Repeating the injection process produced the same result and time frame for the $H_2S$.

From such study the inventor determined a few things, including that: it is important that the water wash flow cell also be packed with non-reactive such as stainless steel wool similar to the counter-flow reactor to break any coarse bubbles and increase the contact surface area between the gas and the water for maximum performance in the reduction of salt and carbonate ions and reduction of same in any carryover vapor; it is important that the non-reactive media in the counter-flow reactor cell maintain saturation with the treatment composition to assure that $H_2S$ content is remediated down to levels below 5 ppm, and preferably close to 0 ppm; and if the Na, Cl ions remain in the water in the natural gas when the gas is reacted with the treatment composition in the reactor, this will tend to form some HCl, which in turn makes it necessary to increase the amount of treatment composition and/or the amount of hydroxides in the treatment composition for remediating the HCl as well as fully remediating the $H_2S$ in the natural gas down to acceptable levels.

The inventor performed a further, very simple study to demonstrate the adverse effects of Na, Cl ions and water on treating contaminated natural gas using the treatment composition according to the exemplary embodiment of the invention. In this study a 1 liter Tedlar® bag was taken of the untreated, wet gas bulk tank from the Lilis Antelope site discussed above and a 1 liter Tedlar® bag of the natural gas after it has passed through the water wash flow cell and the bendix air dryer for removing water vapor and Na, Cl ions. Both bags were injected with 0.1 micro liters of the treatment composition, and then the bags were shaken for 3 minutes and tested for $H_2S$. The wet gas from the bulk tank still had 50,000 ppm $H_2S$, a pH of 5.8 and the original amount of Na, Cl ions. In contrast, the dry gas had 30 ppm $H_2S$ down from 50,000 ppm, a pH of 10, 0.0 ppm Na and 0.026 ppm Cl.

The results of the above examples are very advantageous, not only in terms of effectively and efficiently remediating the many contaminants contained in the natural gas, but also in that the treatment process may be run continuously for an extended period, which makes the treatment system and treatment process practical for efficiently remediating $H_2S$ and other contaminants in gasses, even highly contaminated gasses, at reasonable cost.

The foregoing description is given for clearness of understanding only, and no unnecessary limitations should be understood therefrom, as modifications within the scope of the invention may be apparent to those having ordinary skill in the art and are encompassed by the claims appended hereto. For example, while the exemplary embodiment of the treatment system 100 and treatment process according to the invention include separate components 104, 106, 108, 112 in which sub-processes are conducted for removing salt and water from the contaminated natural gas, as well as the counter-flow reactor 110 in which the treatment composition is used to mitigate $H_2S$ and other targeted contaminants, it is conceivable that the dehydrator 112 or coalescing unit 108 used for removing water from the treatment composition may also be used as a reactor in which the treatment composition is used to mitigate $H_2S$ and other targeted contaminants, such that the treatment composition and natural gas would be reacted together in the dehydrator or coalescing unit at the same time as the dehydration process. The modification would be add the influent natural gas piping to the dehydrator or coalescing unit so that the natural gas is remediated with the treatment composition simultaneously with water being removed from the treatment composition. This is somewhat similar to how a triethylenegylcol (TEG) regeneration system works. The difference between glycol and the proposed modification to the present system and process is that glycol only displaces water, but does not treat $CO_2$, $H_2S$ or any other gasses. The treatment composition according to the exemplary embodiment of the invention treats all the contaminated gasses in one pass and done in the dehydrator would eliminate the need for the reactor towers, maintenance, and corrosion problems. As another example, it is possible to vary the particular formulation of the treatment composition by increasing or decreasing the specific amounts of the various components, by excluding one or more of the components, and by including other components in the treatment composition of the exemplary embodiment, such as carbonates to reduce reactivity of the hydroxide compound(s) with $CO_2$, an antibacterial such as a sulfite compound, etc.

I claim:

1. A treatment composition for remediating $H_2S$ and other contaminant(s) in contaminated gases comprising: an aqueous hydroxide solution containing at least one hydroxide compound at a collective concentration of 35-55 weight percent of the aqueous hydroxide solution; at least one organic acid selected from the group consisting of fulvic acid and humic acid; and a chelating agent, wherein the aqueous hydroxide solution constitutes at least 80 wt % of the treatment composition, the at least one organic acid constitutes 0.1-5 wt % of the treatment composition, the chelating agent constitutes 0.1-5 wt % of the treatment composition, and a pH of the treatment composition is at least 12.0.

2. The treatment composition according to claim 1, wherein the chelating agent includes ethylenediaminetetraacetic acid (EDTA), and the hydroxide compound(s) includes potassium hydroxide.

3. The treatment composition according to claim 1, further comprising at least one of a surfactant and a buffering agent.

4. The treatment composition according to claim 1, wherein at least one hydroxide compound at a collective concentration of 45-55 weight percent of the aqueous hydroxide solution and the aqueous hydroxide solution constitutes at least 90 wt % of the treatment composition.

5. A treatment process for remediating $H_2S$ and other contaminants in a contaminated containing more than 1 ppm water and ionic contaminants, comprising steps of: initially treating the gas in a water wash to reduce collective content of the ionic contaminants in gas below 1 ppm and then treating the gas to reduce water content in the gas below 1 ppm; and then remediating the $H_2S$ and other contaminants in the gas by flowing the gas at a velocity of less than ten feet/sec. through an elongate reaction chamber while contacting the gas with treatment composition according to claim 1 for at least one second.

6. The treatment process according to claim 5, wherein the remediating step involves filling a portion of the reaction chamber with a porous, non-reactive media, flowing the treatment solution into the reaction chamber such that the treatment composition saturates or substantially saturates the media, and flowing the gas through the media as saturated or substantially saturated with the treatment composition.

7. The treatment process according to claim 6, wherein the portion of the reaction chamber filled with the porous, non-reactive media is at least six feet long, and the remediation step involves flowing the gas at a velocity of ≤five feet/sec. while contacting the gas with the treatment composition for at least 1.5 seconds.

8. The treatment process according to claim 6, wherein the porous, non-reactive media as filled into the reaction chamber and saturated or substantially saturated with the treatment composition is configured to break bubbles of the gas and interrupt flow of the gas as the gas flows therethrough.

9. The treatment process according to claim 6, wherein the remediating step involves flowing the treatment composition into at least one of an upper portion and an intermediate portion of the reaction chamber such that the treatment composition flows onto and/or into the porous, non-reactive media while flowing the gas into a bottom portion of the reaction chamber so that the gas flows upward through the treatment composition as disposed with the media.

10. The treatment process according to claim 5, further comprising steps of: withdrawing a portion of the treatment composition from the reaction chamber; dehydrating the withdrawn portion of the treatment composition to remove water therefrom; and flowing the dehydrated treatment composition back into the reaction chamber.

11. The treatment process according to claim 5, wherein the gas also contains $CO_2$ as a contaminant and a pH of the gas as contacted with the treatment composition in the remediation step is at least 7.0.

12. The treatment process according to claim 5, wherein the gas is at a pressure in a range of 25-300 PSI in the water wash and remediation steps.

13. The treatment process according to claim 5, wherein the gas is natural gas from a well.

14. The treatment process according to claim 13, further comprising step of compressing the natural gas, directly after being remediated in the remediation step, into liquefied petroleum gas (LPG).

15. A treatment system for remediating $H_2S$, $CO_2$ and other contaminants in contaminated gases, comprising:
- a water wash cell containing water therein and which is configured to receive a flow of a contaminated gas therethrough such that the gas contacts the water and ionic contaminants in the gas may be transferred to the water;
- a dehydrating unit through which is configured to receive the flow of the contaminated gas after it passes through the water wash cell and to reduce water content of the contaminated gas to less than one ppm; and
- an elongate reactor having an amount of the treatment composition according to claim 1 therein and which is configured to receive the flow of the contaminated gas therethrough after the contaminated gas passes through the dehydrating unit so that the contaminated gas contacts with treatment composition as the contaminated gas passes through the reactor for remediating $H_2S$, $CO_2$ and other contaminants in the contaminated gas, wherein a portion of the reactor is filled with a porous, non-reactive media which is configured to break bubbles of the contaminated gas and interrupt flow of the contaminated gas as the contaminated gas flows therethrough, and the reactor includes at least one injector for flowing the treatment solution into the reactor such that the treatment composition saturates or substantially saturates the media.

16. The treatment system according to claim 15, wherein the portion of the reactor filled with the porous, non-reactive media is at least six feet long, and the reactor is configured to receive the flow of the contaminated gas therethrough at 25-300 PSI.

17. The treatment system according to claim 15, further comprising another dehydrating unit which is configured to receive a portion of the treatment composition withdrawn from the reactor, dehydrate the withdrawn portion of the treatment composition to remove water therefrom for reuse in the reactor.

18. The treatment system according to claim 15, wherein the elongate reactor includes a baffle disposed near an exit of the reactor and which is configured to be contacted by the remediated contaminated gas before the remediated contaminated gas is discharged from the reactor such that droplets of liquid in the remediated contaminated gas may be separated from the remediated contaminated gas and stay within the reactor.

19. The treatment system according to claim 15, wherein a portion of the water wash cell is also filled with a porous, non-reactive media which is configured to break bubbles of the contaminated gas and interrupt flow of the gas as the contaminated gas flows therethrough.

* * * * *